US007283664B2

(12) United States Patent
Magee et al.

(10) Patent No.: US 7,283,664 B2
(45) Date of Patent: Oct. 16, 2007

(54) INTERACTIVE COMPUTER AIDED ANALYSIS OF IMAGES FROM SENSOR COMBINATIONS

(75) Inventors: Michael J. Magee, Rio Medina, TX (US); Ernest A. Franke, San Antonio, TX (US); Jeremy K. Zoss, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 752 days.

(21) Appl. No.: 10/351,115

(22) Filed: Jan. 24, 2003

(65) Prior Publication Data

US 2004/0057618 A1 Mar. 25, 2004

Related U.S. Application Data

(60) Provisional application No. 60/413,368, filed on Sep. 25, 2002.

(51) Int. Cl.
*G06K 9/00* (2006.01)
*G06K 9/46* (2006.01)

(52) U.S. Cl. ............................... 382/165; 382/190
(58) Field of Classification Search ............... 382/164, 382/165, 190
See application file for complete search history.

(56) References Cited

U.S. PATENT DOCUMENTS

| 5,228,119 | A | | 7/1993 | Mihalisin et al. | 395/118 |
|---|---|---|---|---|---|
| 5,546,516 | A | | 8/1996 | Austel et al. | 395/140 |
| 5,621,664 | A | | 4/1997 | Phaal | 364/551.01 |
| 5,631,982 | A | | 5/1997 | Inselberg et al. | 382/281 |
| 5,710,833 | A | * | 1/1998 | Moghaddam et al. | 382/228 |
| 6,005,974 | A | * | 12/1999 | Kochi et al. | 382/190 |
| 6,362,823 | B1 | | 3/2002 | Johnson et al. | 345/440 |
| 6,539,106 | B1 | * | 3/2003 | Gallarda et al. | 382/149 |
| 6,603,477 | B1 | * | 8/2003 | Tittle | 345/440 |
| 6,678,395 | B2 | * | 1/2004 | Yonover et al. | 382/103 |
| 6,768,820 | B1 | * | 7/2004 | Yakhini et al. | 382/289 |
| 6,834,122 | B2 | * | 12/2004 | Yang et al. | 382/227 |

OTHER PUBLICATIONS

Data visualization: parallel coordinates and dimension reduction, Chen, J.X.; Wang, S.; Computing in Science & Engineering [see also IEEE Computational Science and Engineering], vol. 3, Issue 5, Sep.-Oct. 2001, pp. 110-113.*

(Continued)

*Primary Examiner*—Wenpeng Chen
*Assistant Examiner*—Yuzhen Ge
(74) *Attorney, Agent, or Firm*—Baker Botts LLP

(57) ABSTRACT

A method of interactively using a computer to select a sensor combination for analyzing images of a scene in order to distinguish between objects or patterns. Two or more images are acquired, each image from a different sensor. One or more regions of interest (ROIs) are then defined in the scene. A parallel axis plot is then used to display pixel traces of pixels from the ROI, with each axis of the plot representing one of the images. One or more axes may then be constrained, by selecting a range of values on an axis. Pixel traces that satisfy the constraint are illustrated graphically. Further analysis is performed by displaying pixel images of the constrained image, and by performing statistical analysis of the constraint(s).

46 Claims, 31 Drawing Sheets
(14 of 31 Drawing Sheet(s) Filed in Color)

OTHER PUBLICATIONS

Visualising and tracking uncertainty in thematic classifications of satellite imagery; Bastin, L.; Wood, J.; Fisher, P.F.; Geoscience and Remote Sensing Symposium, 1999. IGARSS '99 Proceedings. IEEE 1999 International; vol. 5, Jun. 28-Jul. 2, 1999, pp. 2501-2503 vol. 5.*

9.1.2 Profile Plots—display treatment effects at http://www.math.sfu.ca/stats/Courses/Stat-650/Notes/Handouts/node255.html 1 page, Printed Jun. 5, 2001.

9.1.2.4 Further Examples at http://www.math.sfu.ca/stats/Courses/Stat-650/Notes/Handouts/node259.html 1 page, Printed Jun. 5, 2001.

Inselberg's, "Parallel Coordinates Software" at http://www.csc.fi/math_topics/Mail/NANET95/msg00319.html 1 Page, Apr. 16, 1995.

IBM's, "Parallel Visual Explorer at work in the money markets" at http://www.ibm.com/News/950203/pve-03.html 8 Pages, Printed Jun. 18, 1997.

Inselberg et al.'s, "Human Vision, Visual Processing, and Digital Display IV" SPIE-The International Society for Optical Engineering vol. 1913. 19 Pages, Feb. 1993.

"Xmdv Tool Home Page" printed from internet at http://davis.wpi/~xmdv/history.html, pp. 1-3, Printed Jun. 20, 2003.

* cited by examiner

FIG. 21 ROIs

UNCONSTRAINED ZIP

ZIP RAMP CONSTRAINED BY HUE

RAMP PIXEL IMAGE CONSTRAINED BY HUE

FIG. 25 RAMP CONSTRAINED BY TEXTURE

RAMP CONSTRAINED BY TEXTURE

RAMP CONSTRAINED BY HUE AND TEXTURE

RAMP CONSTRAINED BY HUE AND TEXTURE

ALL CONSTRAINED BY HUE, SATURATION, TEXTURE

INTERACTIVE COMPUTER AIDED ANALYSIS OF IMAGES FROM SENSOR COMBINATIONS

RELATED PATENT APPLICATION

This application claims the benefit of U.S. Provisional Application No. 60/413,368, filed Sep. 25, 2002 and entitled "Interactive Computer Aided Analysis of Images From Sensor Combinations".

GOVERNMENT RIGHTS

This invention was made with government support under government contract number F0863001D00220002 (SwRI Project No. 10-04729), with the U.S. Air Force, Eglin Air Force Base/Wright Laboratory, Florida. The government has certain rights in the invention.

TECHNICAL FIELD OF THE INVENTION

This invention relates to image processing, and more particularly to methods of analyzing images from different combinations of spectral band sensors (or from combinations of other spatial image sensors).

BACKGROUND OF THE INVENTION

A "multispectral" imaging system can be defined as an imaging system that collects images from two to fifteen or so spectral bands. These bands range from about 400 to 2500 nanometers in the electromagnetic spectrum. In the physical world, this range of wavelengths represents a spectral "window" in the atmosphere where sunlight passes through and strikes the earth. A "band" is a portion of this spectrum with a given spectral width, such as 10 or 50 nm. Other imaging systems are referred to as "hyperspectral", and collect images from dozens to hundreds of spectral bands, usually narrower than those collected by multispectral imaging systems.

Examples of multispectral and hyperspectral imaging systems are airborne or satellite-based imaging systems that collect images representing light reflected from the earth. These systems are also often referred to as multispectral or hyperspectral remote sensing systems.

The availability of multispectral and hyperspectral imaging systems has provided the designers of imaging systems the ability to select from among a wide variety of sensors and sensor combinations. Electro-optical (EO) imaging devices such as color (RGB) and monochromatic cameras are able to produce a two dimensional array of information similar to that projected onto the human retina. Other imaging devices, such as infrared (IR) cameras and passive millimeter wave (PMMW) sensors, are able to operate at wavelengths outside the human visible spectrum, thereby being able to differentiate objects from the background based on other characteristics such as thermal gradients. Other sensors such as LADAR (laser radar) add another dimension of information by providing range as well as reflectance data.

It is also possible to derive images from the "primary" images collected by various sensors. For example, images representing characteristics such as hue, saturation, and texture can be derived from RGB images. These derived images can also be useful in analyzing a particular scene.

Depending on the desired application of a particular imaging system, the images from one combination of sensors is likely to be more useful than another. There exists a need for a method to facilitate evaluating the effectiveness of various combinations of sensors.

BRIEF DESCRIPTION OF THE DRAWINGS

The patent or application file contains drawings in color (FIGS. 19-32). Copies of this patent or application publication with color drawings will be provided by the office upon request and payment of the necessary fee.

FIG. 18 illustrates a display of numerical analysis for the Mahalanobis plot.

DETAILED DESCRIPTION OF THE INVENTION

The following description is directed to a method for accomplishing the following objectives: the importation of images from different sensors, the display of the data to provide insight relative to combinations of sensors that might be effective for specific applications, and the evaluation of potentially effective combinations of sensors using formal quantitative metrics.

The raw data to be analyzed comprises two or more spatial (two dimensional) pixel images of the same scene, each image acquired from a different sensor. As explained below, the term "image" is used herein in a broad sense to mean any two dimensional image of a scene, regardless of whether the image represents intensity data from a spectral band sensor, data from a sensor other than a spectral band sensor, or data derived from a primary image acquired by a sensor. The term "image from a different sensor" is also used in a broad sense, such that "from" includes images that are directly acquired or stored and the "sensor" could be any device that collects an image. Thus, the image could be an image from a single sensor, an image from an element of a multiband sensor or other sensor that collects multiple images, a stored image from a sensor (or sensor element), or a computer-generated image (such as from a virtual sensor).

For example, the raw data might be a set of images of the same scene but acquired by spectral band sensors for different wavelengths. An example of such raw data is a set of images collected from hyperspectral or multispectral remote sensing equipment, such as a satellite. These images are each from a different spectral band. More specifically, the "image cubes" acquired with such equipment typically represent data as a spatial scene in the x,y axis, with the z axis being the spectral bands. Each "slice" of the z axis would be an image from a particular spectral band.

An example of an image from a sensor other than a spectral band sensor is a two dimensional map of the magnetic field or the gravitational field of a geographic area. Other examples are temperature or pressure maps.

Another example of raw data images is a set of three spectral band images acquired with RGB (red, green, blue) camera equipment. These images can be processed to obtain derived images, representing image characteristics such as hue, saturation, value, and texture. Derived images could be obtained for many other types of image characteristics. For example, images could be derived to represent measures of geometric shape (such as linearity or circularity), orientation (such as horizontality or verticality), or motion (such as speed or direction).

Figure 1:
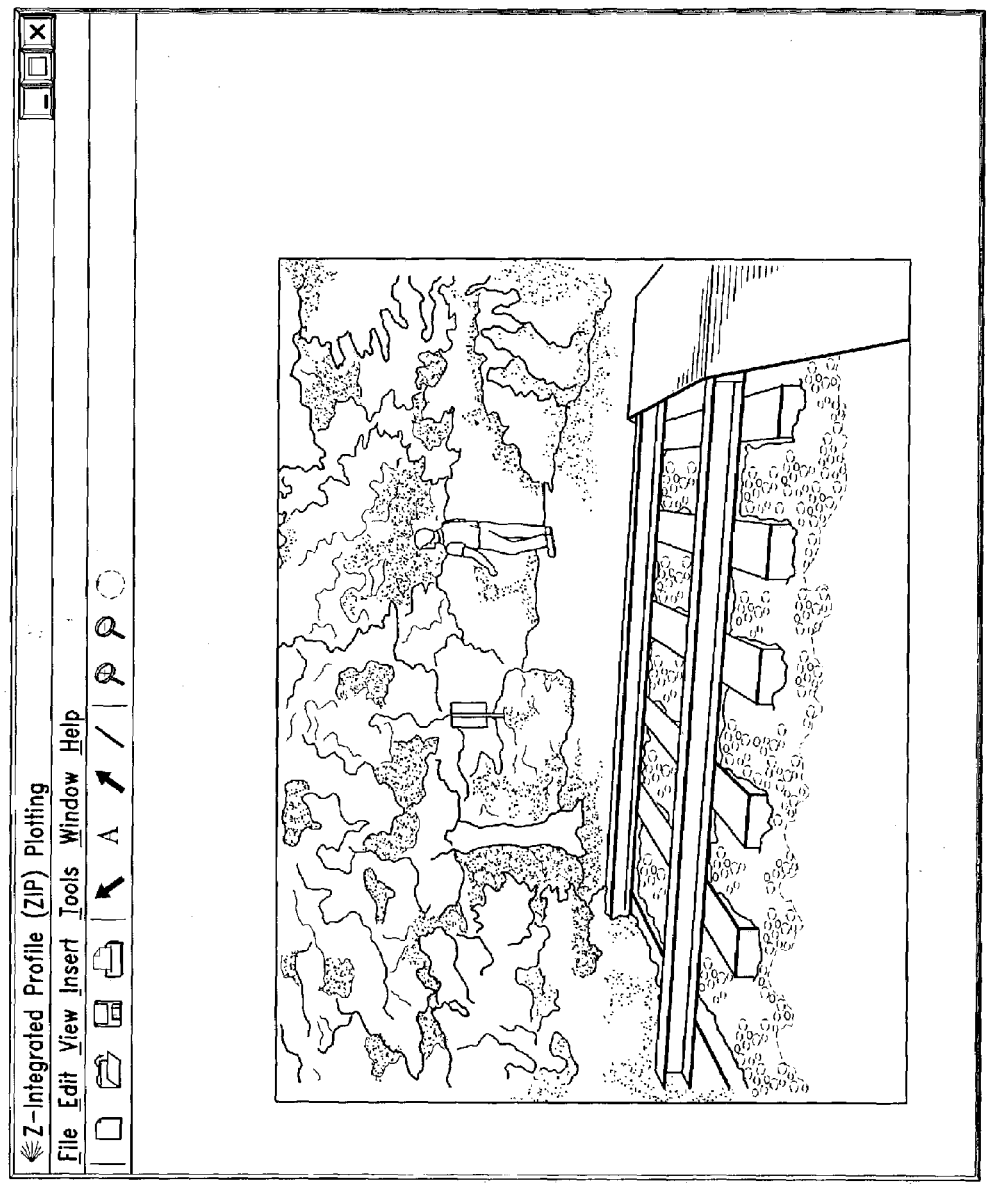
FIG. 1 illustrates an RGB rendering of a real world scene.

FIG. 1 illustrates an RGB rendering of a real world scene. Images from this scene are used as examples throughout this description. In other words, it is from this scene that primary or derived images from different sensors are acquired. In the example of this description, the objective is to select a combination of sensors that is effective in separating pixels belonging to various known objects in the scene. Then, these sensors can be used to acquire images that will permit the same objects to be readily identified in a scene whose content is unknown. For example, if it is known that a certain combination of sensors will separate foliage from other objects in the scene, the same sensors can subsequently be used to acquire images of unknown content to determine if foliage is present in any of them.

The ability to identify objects in a scene is but one example of applications of the invention; there are a myriad of applications for which the invention is useful. As another example, a scene could be periodically inspected to determine if objects acquire different characteristics.

The methods described herein are implemented with interactive software, meaning that a user views and modifies displays on a computer screen, using the displays to intuitively reach a desired hypothesis. The software is capable of operating on a personal computer, such as is commercially available. The embodiments described herein may be easily implemented as a standalone application that runs on a Windows-based computer platform. A suitable programming environment is MatLab, with its image processing and signal processing tools. The graphical user interfaces (GUIs) described below may be designed using the MatLab GUI Design Environment. These are products of The MathWorks, Inc. Other programming and interface programming environments and tools may also be suitable. As used herein, the invention is implemented as a "computer system" having appropriate hardware, operating system, and programming in accordance with the invention.

Overview of Image Analysis Method

Figure 2:
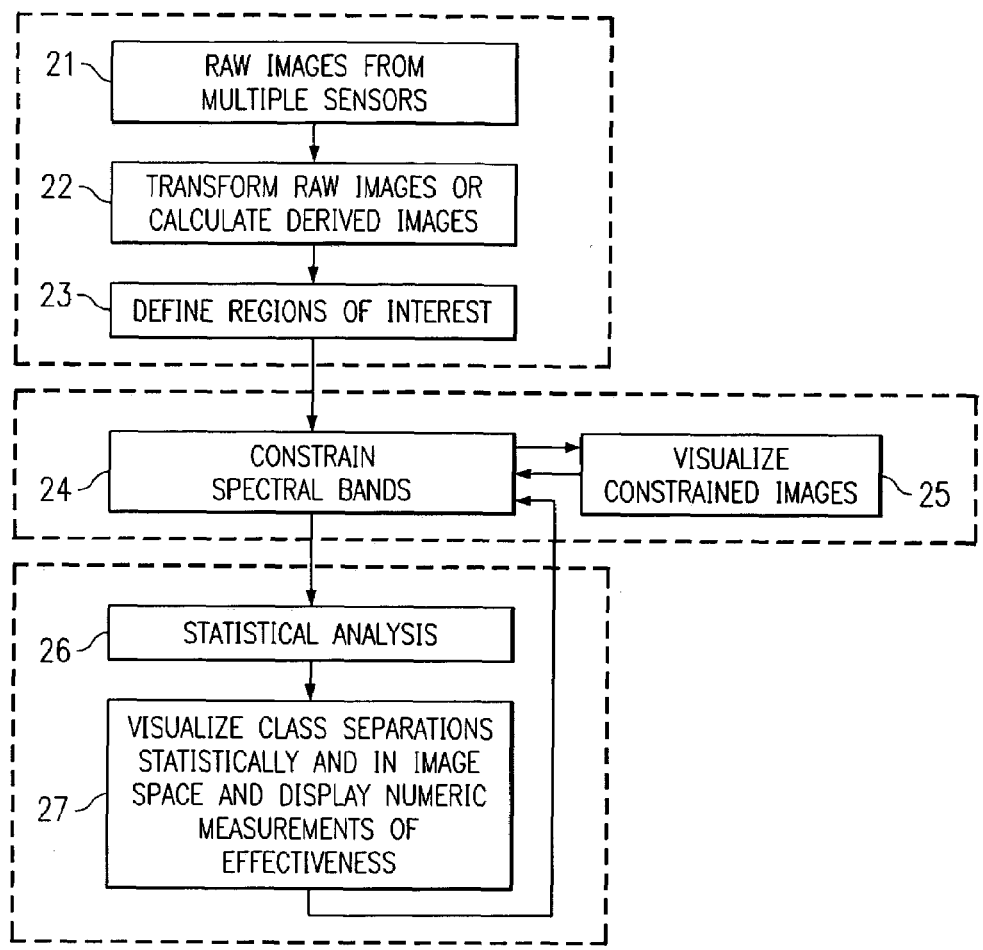
FIG. 2 illustrates the basic steps of a method of analyzing images from different sensors in accordance with the invention.

FIG. 2 illustrates the basic steps of the method of analyzing images from different sensors in accordance with the invention.

Steps 21-23 involve image importation and selection. In Step 21, raw images are imported directly from an imaging system or from a database. The tool is capable of importing data stored in various image formats. In Step 22, transformations, if needed, are applied. In Step 23, once a set of images is selected and imported, regions of interest are defined. These regions of interest correspond to feature classes that are to be distinguished as an objective in a particular image processing application.

Steps 24 and 25 involve forming a hypothesis. In Step 24, by selecting and constraining a subset of the images, the user may easily hypothesize which combination of sensors is likely to be most effective for a specific application. In Step 25, the results of applying the constraints are rendered in image space. This gives the user the opportunity to visualize the interdependence or independence of data across sensors. The user is then able to hypothesize a particular combination of sensors. The visualization indicates whether the hypothesis step should iterate again (in order to refine the hypothesis), or pass control to a quantitative evaluation process.

Steps 26 and 27 involve quantitative evaluation. The tool is capable of assigning quantitative measures of effectiveness for evaluating combinations of sensors. Once the evaluation step is reached, statistically based measures are computed. In Step 27, the results of separating feature classes are visualized for the purpose of determining whether additional hypothesis refinement is needed.

Software Architecture

Figure 3:
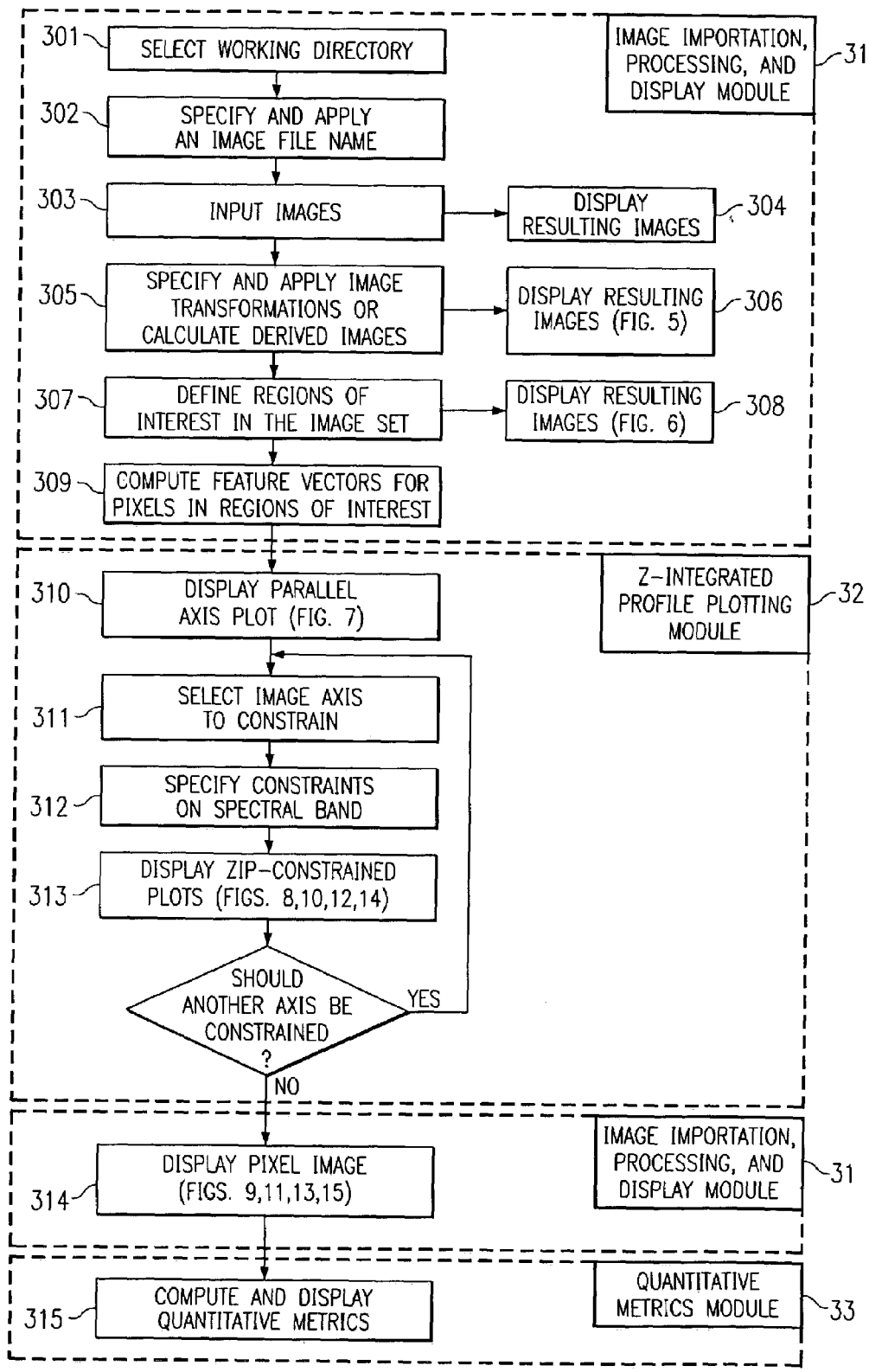
FIG. 3 illustrates the computer software for implementing the method of FIG. 2.

As illustrated in FIG. 3, the software consists of three main modules, namely, an Image Importation, Processing, and Display module 31, a Z-Integrated Profile (ZIP) Plotting module 32, and a Quantitative Metrics module 33. Each of these modules is described in detail below, but in general terms, the purpose of module 31 is to import images that are available in various image formats, to permit the user to apply image transformations, and to compute feature vectors in preparation for further processing. Module 32 facilitates hypothesizing combinations of user-selected constraints on different sensors by visualizing the results of these combinations. Module 33 computes statistically based metrics by which the effectiveness of the constrained sensor combinations may be evaluated and provides the ability to visualize the statistical separation of these classes.

Image Importation, Processing, and Display

Figure 4:
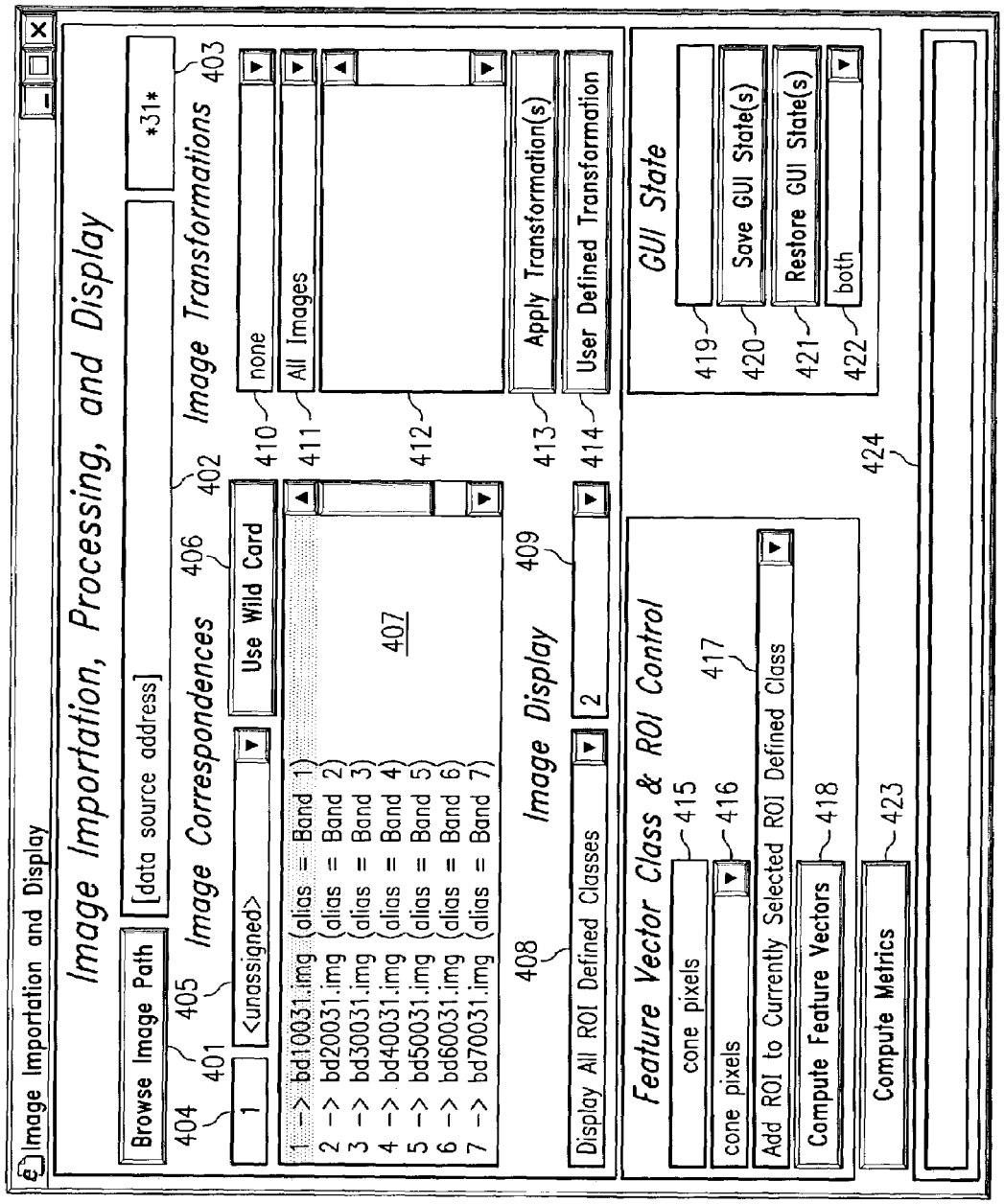
FIG. 4 illustrates the graphical user interface for the image importation steps of FIGS. 2 and 3.

FIG. 4 illustrates the user interface for the IIPD Module. The following table lists the elements identified in FIG. 4:

401. Image path name browsing button
402. Current image path name text box
403. Current image file wild card text box
404. Image number text box
405. Image file name correspondence menu
406. Image correspondence wild card activation button
407. List of current image number/image file correspondences 408. Image display option menu
409. Current display figure menu
410. Image transformation menu
411. Image(s) to be transformed menu
412. List of transformations to be applied to images
413. Apply image transformations activation button
414. User defined transformation activation button
415. Feature class name text box
416. Feature class menu
417. Region of interest (ROI) management menu
418. Feature vector computation button
419. GUI state name text box
420. Save GUI state button
421. Restore GUI state button
422. GUI state(s) save/restore menu
423. Quantitative metrics computation button
424. Advisory message text box As stated above, the method described herein is not limited in utility to analyses based only on intensities that have been extracted from primary images (from spectral band sensor or other image sensors), but may be applied to analyses involving derived images as well. The example application described herein makes use of both types of images.

Figure 5:
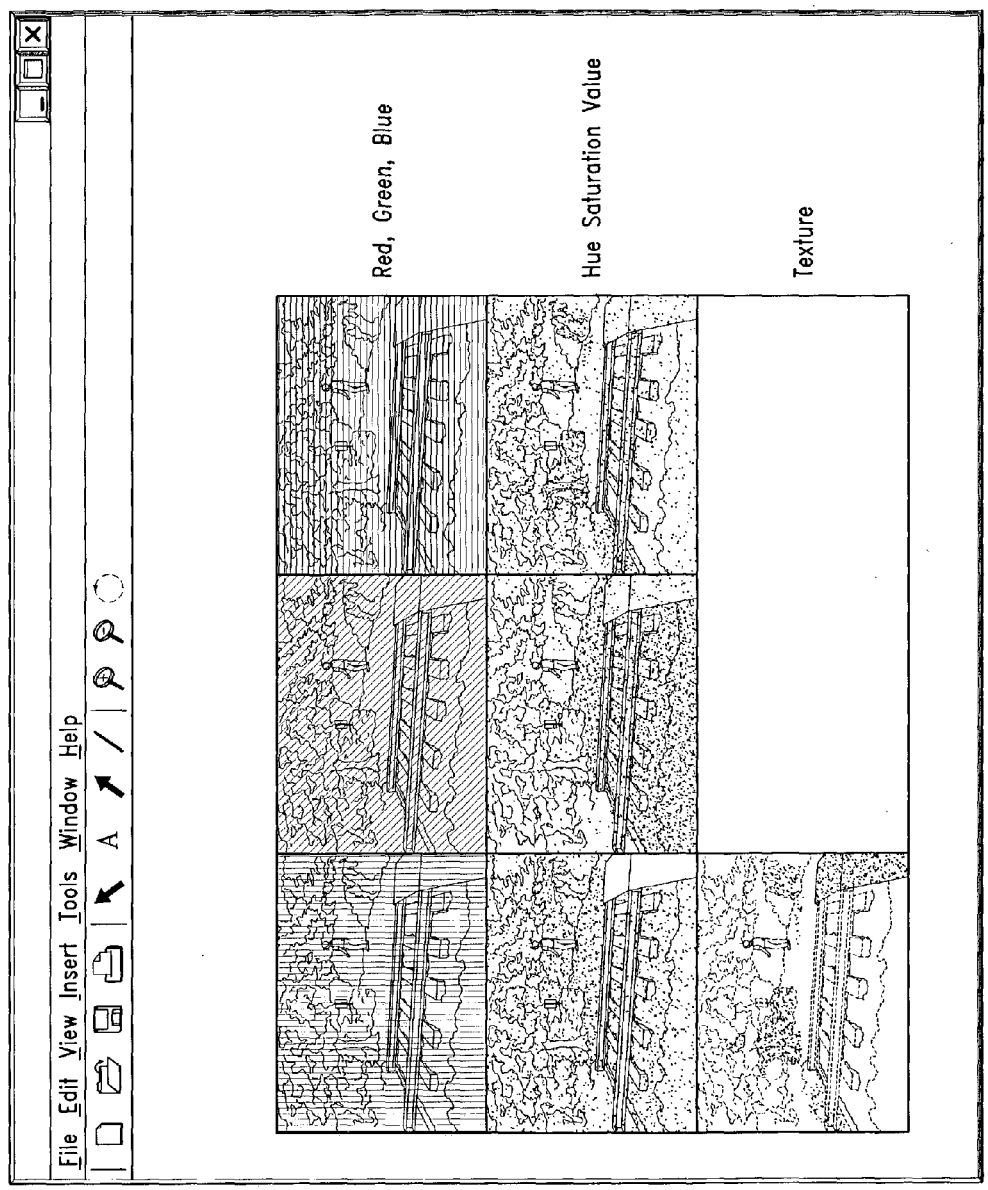
FIG. 5 illustrates a set of seven images to be analyzed, each being either a primary image from an RGB sensor or a derived image.

FIG. 5 illustrates a set of seven images, each acquired or derived from the scene of FIG. 1. In the example of FIG. 5, the seven image axes comprise the following: red, green, blue, hue, saturation, value, and texture. Thus, the red, green, and blue images are each from a different spectral band sensor. The remaining images are derived from the spectral band images. Specifically, the composite RGB image is re-calculated into corresponding hue, saturation, and value (HSV) images. Subsequently, a texture operator is applied to the intensity (value) image, thereby producing a texture image where areas of mottled (non-uniform) intensities are bright and areas of relatively homogeneous intensities are dark.

Referring again to FIG. 3, the images of FIG. 5 are the result of Step 306. Steps 301-306 have been performed using the GUI of FIG. 4.

Step 305 could also include image transformations such as intensity scaling. For example, for a particular image, it may be that the intensities have a substantial variation in magnitude. For such an image, it may be desirable to apply a transformation that scales the intensity, by first applying a logarithmic transformation and then linearly stretching the result.

If a particular image is rendered, it is often the case that the intensities of certain objects are similar enough as to make them virtually indistinguishable from other objects. For example, in the red, green, and blue images of FIG. 5, the intensities of the ramp and foliage are similar. It is then appropriate to investigate which combinations of images could be constrained to provide better separation of pixels in these classes.

Figure 6:
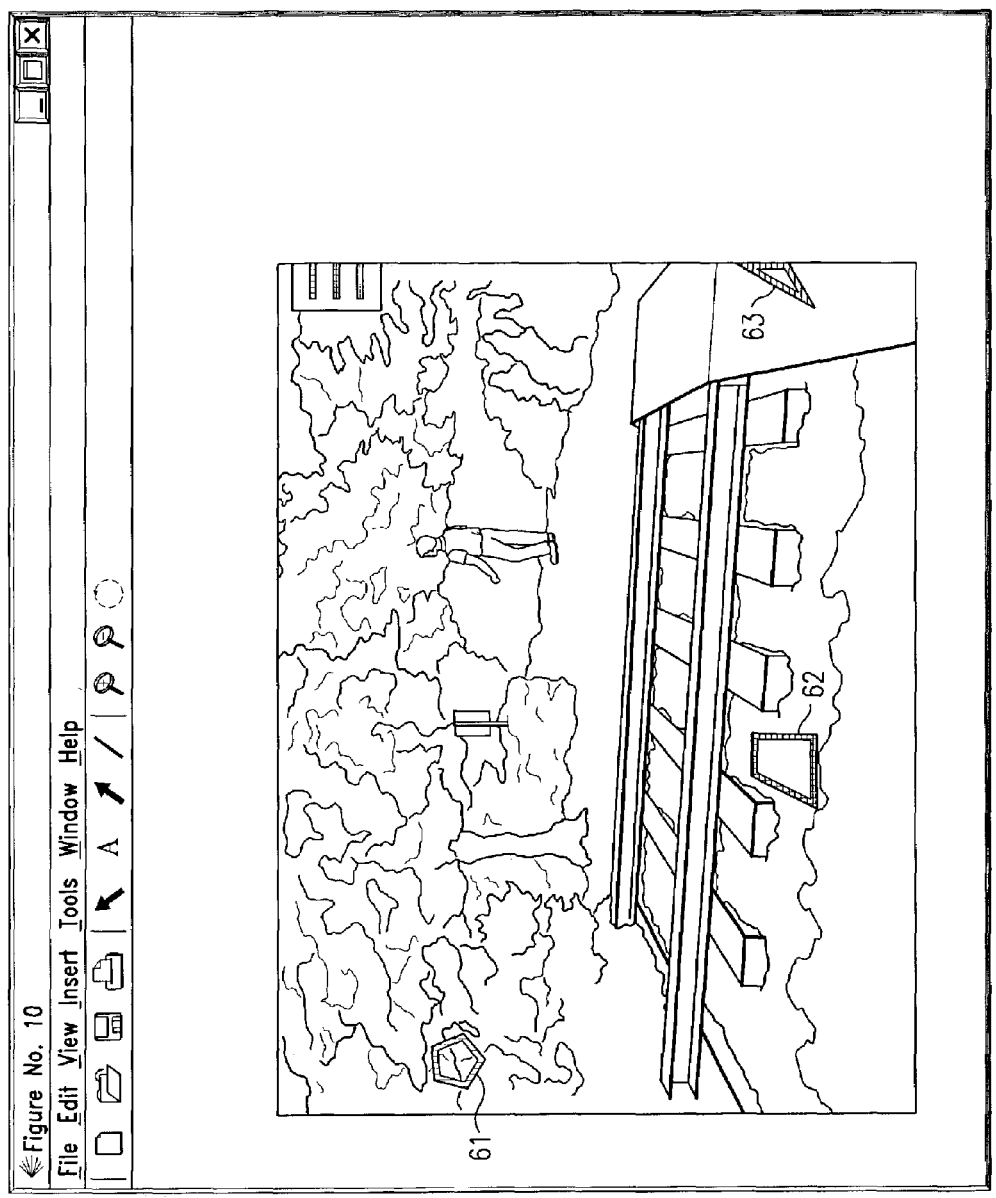
FIG. 6 illustrates the selection of regions of interest in the scene.

FIG. 6 illustrates the selection of regions of interest (ROIs) in the scene. In order to facilitate this investigation, it is necessary for the user to delineate regions of pixels belonging to classes that are to be distinguished from each other. This may be accomplished by interactively defining polygonal ROIs containing sample pixel sets. In the example of this description, three ROIs 61, 62, and 63 have been selected, each from a different class of objects—the leaves, gravel, and ramp, respectively. In other words, each ROI represents a different class to be distinguished from the rest of the scene.

The image of FIG. 6 is the result of the user action in Step 307 and the display of Step 308. The GUI of FIG. 4 includes appropriate dialog boxes and menus 415-417 to aid the user in defining classes and ROIs. The ROIs may be drawn by the user in any arbitrary shape. For example, the user may draw a polygon, using known computer drawing tools, to enclose a desired set of pixels.

It should be noted that at any point in the process of FIG. 3, the visual rendering of a pixel image is optional. However, the ability of the user to view rendered images, as provided for in Steps 304, 306, and 308, greatly enhances the interactive advantages of the invention.

The purpose of defining ROIs is to provide a basis for extracting a set of data vectors, a vector for each pixel, for subsequent visual analysis and evaluation. This is consistent with Step 309 and implemented with the GUI button 418 of FIG. 4.

Z-Integrated Profile (ZIP) Plot Analysis

Figure 7:
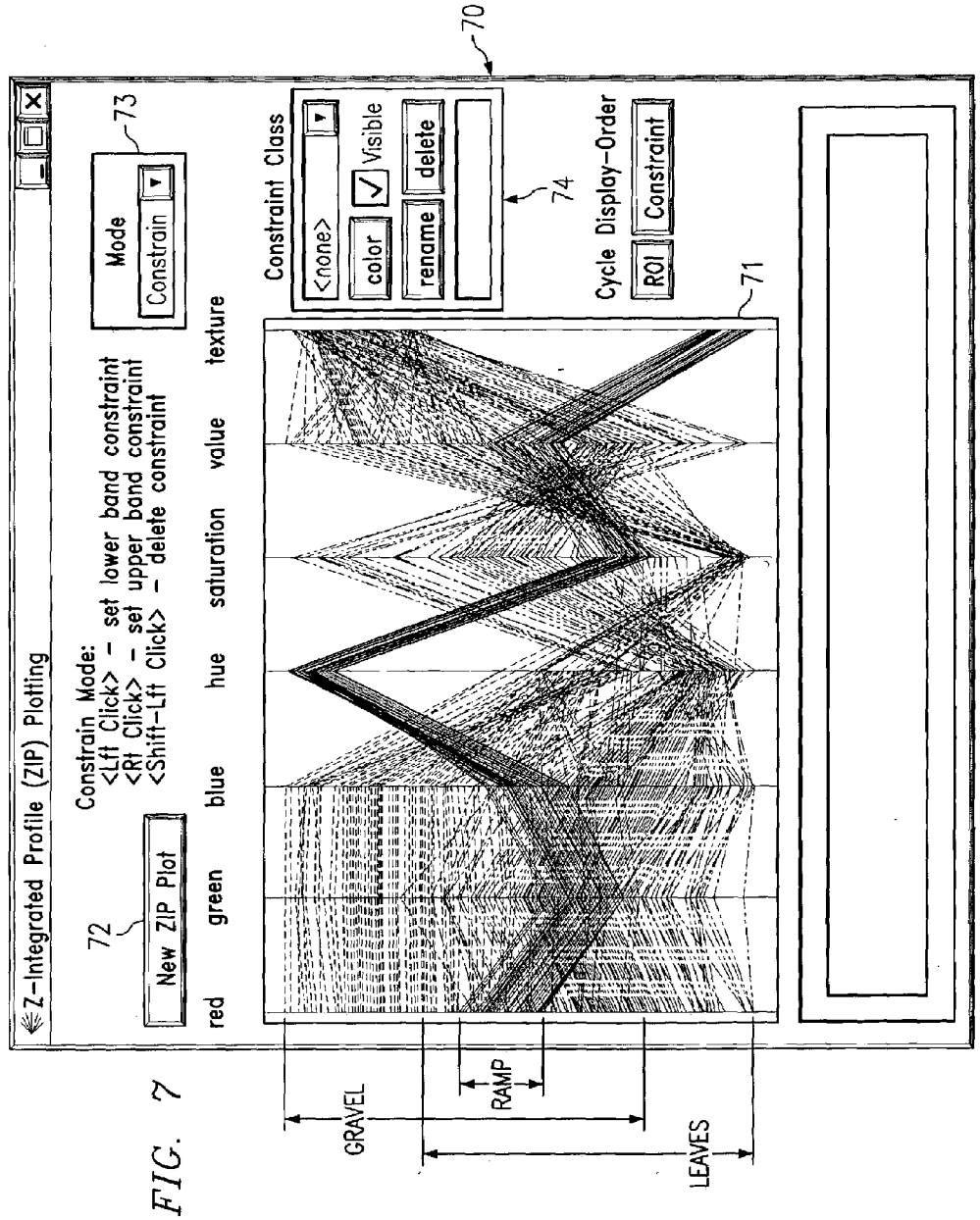
FIG. 7 illustrates the graphic user interface for parallel axis plots, with a display of a parallel axis plot of the images of FIG. 5 and the regions of interest of FIG. 6.

FIG. 7 illustrates the graphic user interface 70 for implemented module 32 of FIG. 3. The display 71 is a particular plot based on the images of FIG. 5 and the regions of interest of FIG. 6.

After regions of interest have been selected in an image set, interactive visual analysis of the data in these sets may be initiated using the GUI 70. The plot 71 displays data from multiple images simultaneously. Each image is assigned to a vertical axis distributed equally across the display area. In other words, there is a vertical axis for each image (each a primary or derived image from a different "sensor"). Plot 71 may be generally referred to as a "parallel axis" plot, and is the result of Step 310 of FIG. 3.

The vertical position along each axis represents an image intensity (or derived functional value), with lower intensities plotted towards the bottom of the axis and higher intensities plotted near the top. To produce a trace on plot 71 of a pixel, the intensity of a given pixel location is plotted on the corresponding axis and all intensities for that pixel are connected with a line. This trace represents the relationship between different axes for a given pixel. A separate trace is plotted in the display area for each pixel in the selected ROIs. Typically, the plot does not contain a trace for every pixel in the image. Rather, only pixels in user-selected ROI classes are plotted. These traces are then colored according to their source ROI class.

A parallel axis plot, such as that of FIG. 7, whose axes represented only spectral band images can be compared to the "image cubes" discussed above. In an image cube, each pixel has a spatial position in the x,y axis with each plane in the z direction corresponding to an image in a different spectral band. Different intensities within each of these image planes are represented by different colors. In a parallel axis plot, an eight axes plot would correspond to eight slices along the z axis of the image cube. Each horizontal trace is associated with a different pixel. A pixel's z axis values from the image cube would be plotted on the parallel axis plot for selected bands. Each z axis intensity value would be represented as a value on the y axis of the parallel axis plot.

As indicated by button 72 on GUI screen 70, the user may elect to view a new parallel axis plot. This might occur if the plot indicates that intensity transformations would be useful or that other or additional axes would be useful. Button 73 permits the user to select a mode, which could be a different view such as zoom or expand or a constrain mode, discussed below. A further mode might be an "auto constrain" mode, in which statistical analysis is performed and image constraints are determined automatically.

A concept underlying the parallel axis analysis is to render each vector associated with a given pixel in a standard manner that is independent of the dimensionality of each vector. This is accomplished by assigning to each image a vertical axis and tracing each individual pixel's intensities across the different axes that correspond to the images. As the result of tracing groups of pixels within the "ramp" ROI, for example, a relatively coherent set of traces is produced across all axes. The traces are coherent in the sense that their range of intensities is fairly narrow across all bands. In contrast, the traces belonging to the "leaves" and "gravel" ROIs vary widely in intensity in most axes.

The display of pixel trace data is only part of the functionality of the parallel axis plot. Interactive plotting allows the user to impose minimum and maximum constraints on different axes and observe the coupling between different axes and the underlying images. These constraints represent various combinations of pixel sets, which can be used to extract isolated image features. A combination of constraints on different pixel sets defines a constraint class. Multiple constraint classes may be defined by creating several sets of constraints. Traces that meet all the constraints of a given set are colored according to the corresponding constraint class. As the bounds of a constraint class are adjusted, the trace colors are updated dynamically. This dynamic interaction helps give the user a better understanding of how various pixel sets are related, and provides the user with insights when deciding where to best place a set of constraints for best separation of image features.

Figure 8:
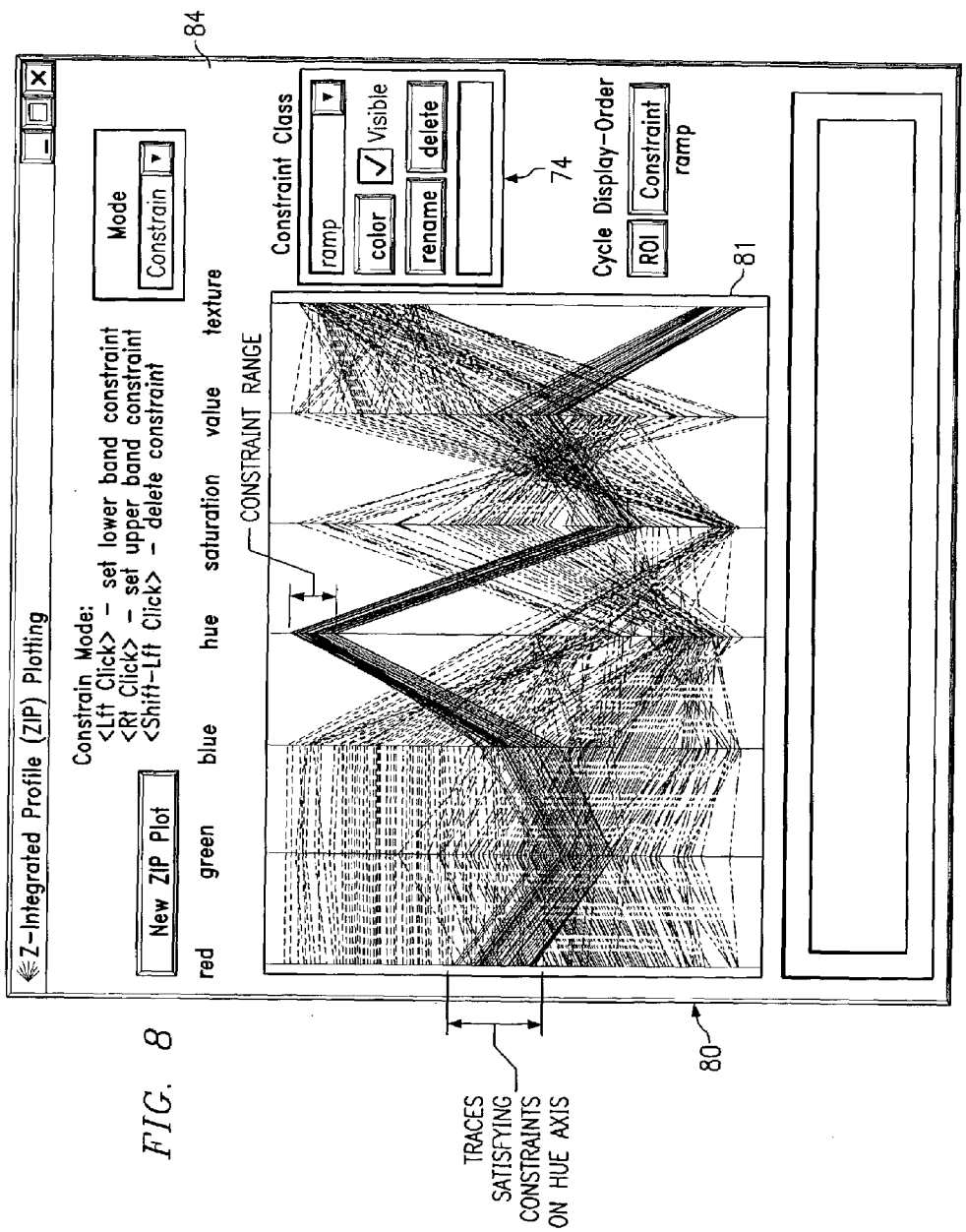
FIG. 8 illustrates the plot of FIG. 7, with the addition of a graphical display of a hue constraint and pixel traces that satisfy the constraint.

FIG. 8 illustrates the dynamic nature of such user interactions. In FIG. 8, the GUI screen 70 from FIG. 7 has been used to define a constraint class on the ramp, to specify the axis to which the constraint is to be applied, and to define the range of the constraint. Referring again to FIG. 3, the parallel axis plot 81 is the result of the user action of Steps 311 and 312 of FIG. 3 and the operation of module 32. In Step 313, the resulting data was used by module 31 to generate the display.

More specifically, in the example of FIG. 8, the user has hypothesized that the hue axis may be useful in distinguishing ramp ROI pixels from gravel and foliage ROI pixels. After interactively constraining minimum and maximum values in the hue axis (as shown by the bolded portion on that axis), the traces satisfying those constraints are highlighted. Only ramp traces are highlighted because neither the foliage nor the gravel satisfies the constraint. That is, within the intensity range of the constraint on the hue axis, neither the foliage nor the gravel have intensity values.

The plot 81 of FIG. 8 illustrates the bolded constraint and the highlighted constrained pixel traces. The GUI constraint menu 84 was used to specify and color the constraints. As indicated on screen 80, the constraint may be defined by simple mouse clicks. The use of color to identify the constraint range and to identify pixel traces satisfying the constraint is but one example of how constraints and pixel traces may be identified. Various other computer graphics techniques could be used.

Figure 9:
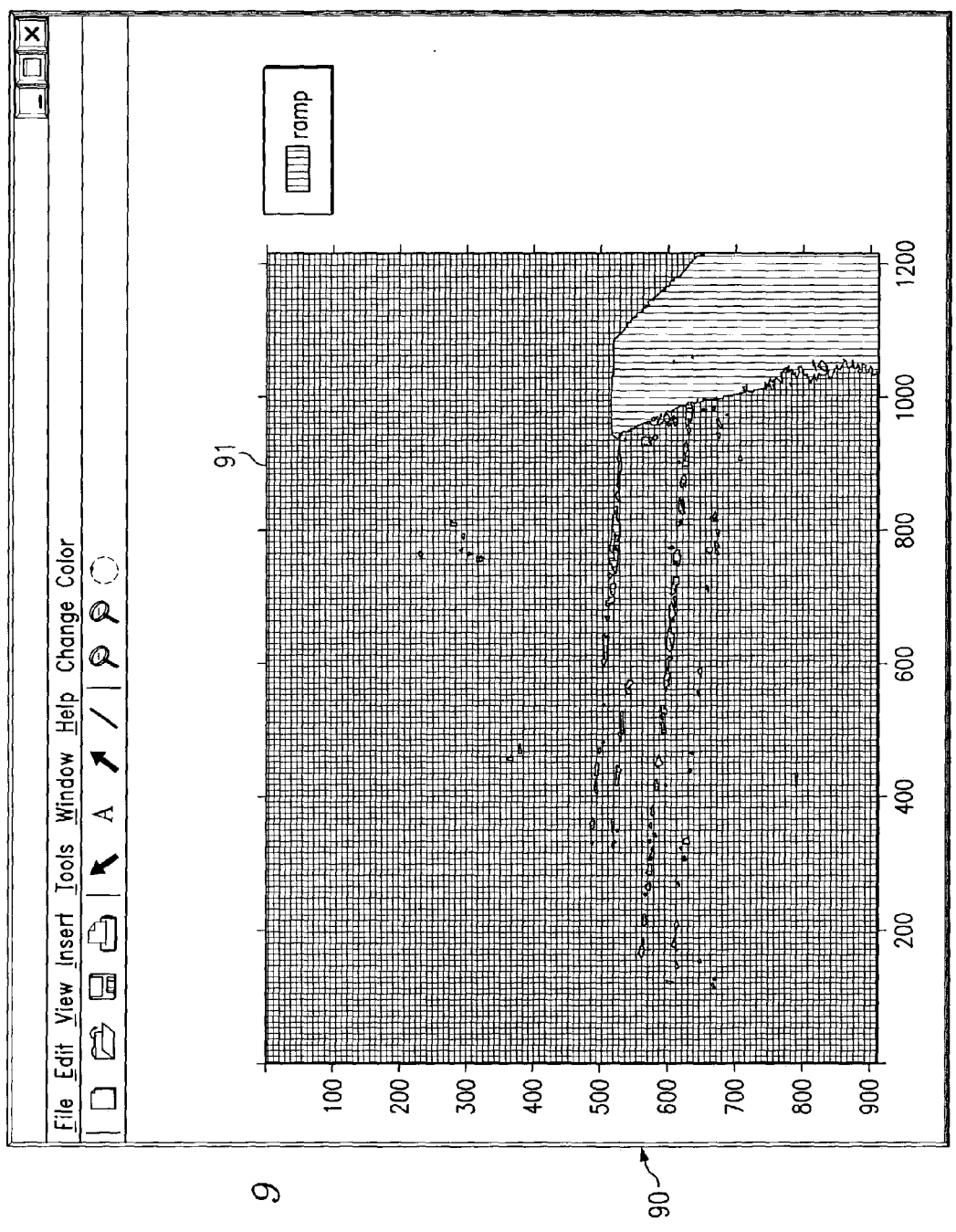
FIG. 9 illustrates the pixel image resulting from the constraint of FIG. 8.

FIG. 9 illustrates a screen 90 that contains a pixel image 91 resulting from the constraint of FIG. 8. The image 91 is consistent with Step 314 of FIG. 3. Consistent with the constraint, the image 91 is of the hue axis in the selected intensity range. As indicated, the ramp is fairly well separated from the rest of the image, although other regions of the image, such as portions of the railroad track, remain visible in the image. This indicates to the user that further constraints might be attempted to separate the ramp from the rest of the image.

Referring again to FIG. 3, the method is iterative in the sense that the user selects an axis, constrains it, visualizes the results, and repeats the process with additional or different axes, until the results are satisfactory. At any point, the user may perform the quantitative analysis of Step 315 (explained below) to aid in the decision process. This iterative process combines the benefits of intuitive reasoning in response to the parallel axis plots, with the benefits of statistical analysis.

Figure 10:
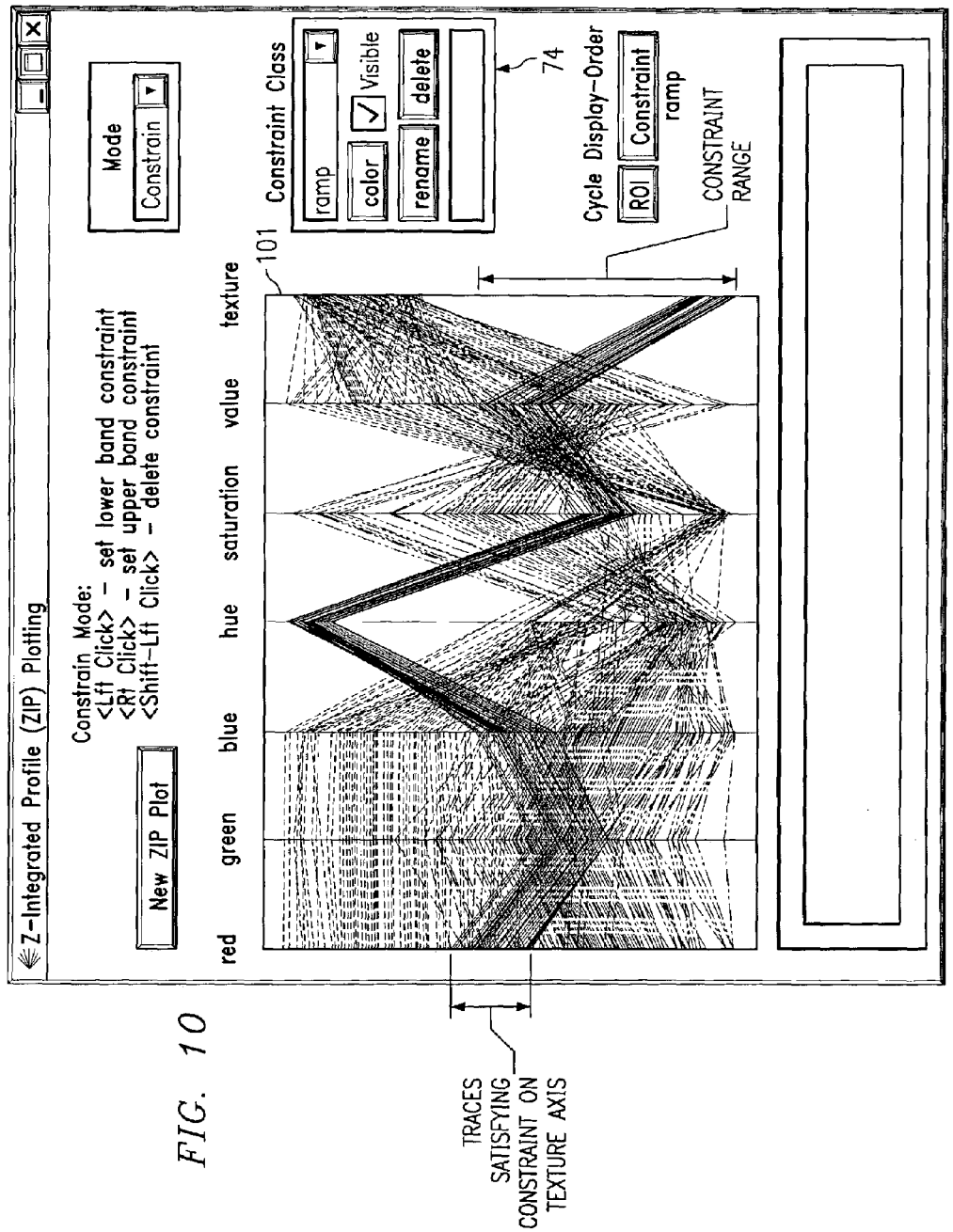
FIG. 10 illustrates the plot of FIG. 7, with the addition of a graphical display of a texture constraint and pixel traces that satisfy the constraint.

As indicated by FIG. 10, the user has decided to apply additional constraints, and has returned to the parallel axis plot GUI 70. In the resulting plot 101, which is of the same constraint class (the ramp), the user has constrained the texture axis, where again, the ramp indicates good separation from the other ROIs (the foliage and the gravel).

Figure 11:
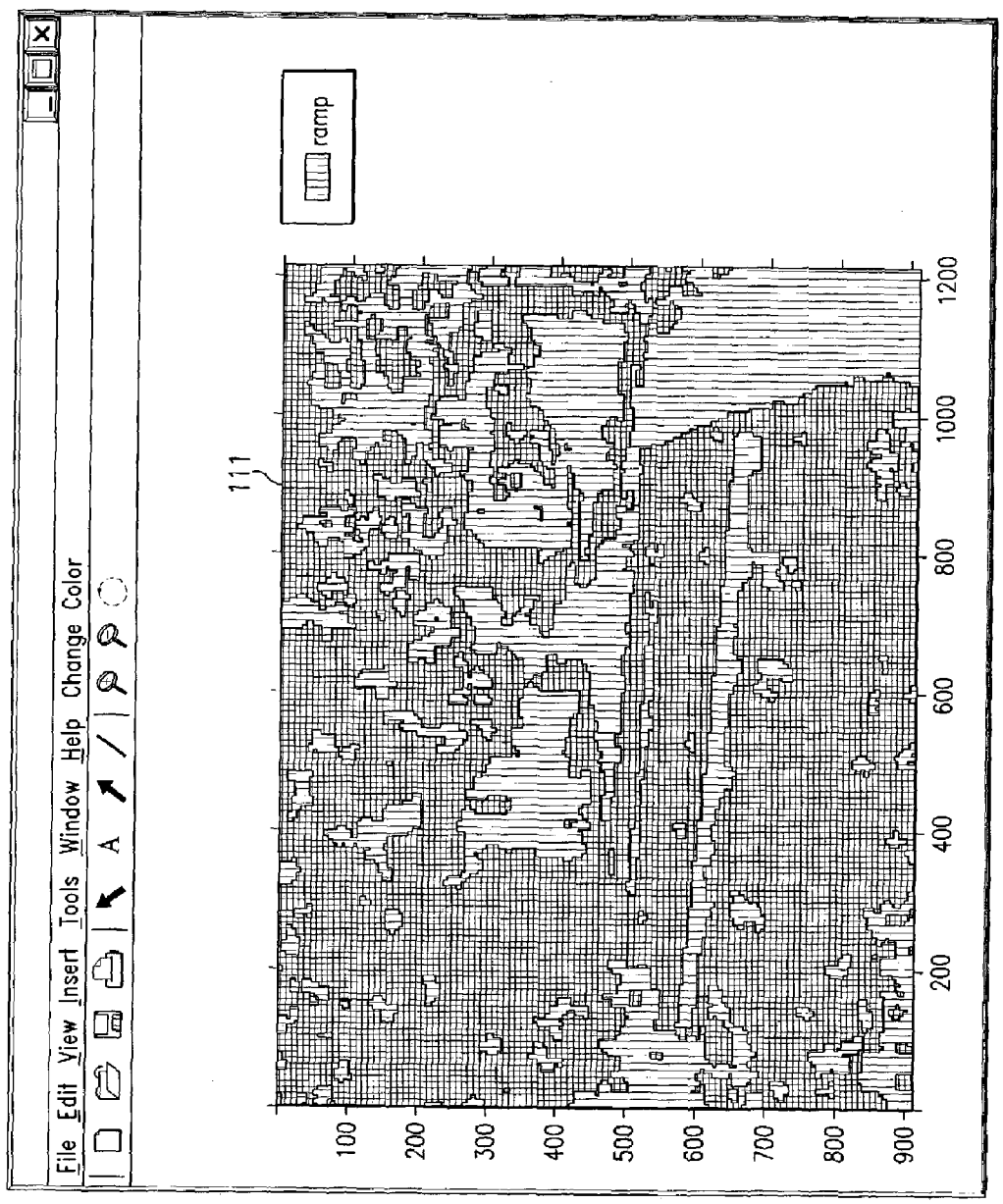
FIG. 11 illustrates the pixel image resulting from the constraint of FIG. 10.

FIG. 11 illustrates the pixel image 111 resulting from the constraint of FIG. 10. Although this constraint does provide separation of the ramp (which is "smooth") from the other ROIs (which are textured), other regions of the scene remain in the texture image.

Figure 12:
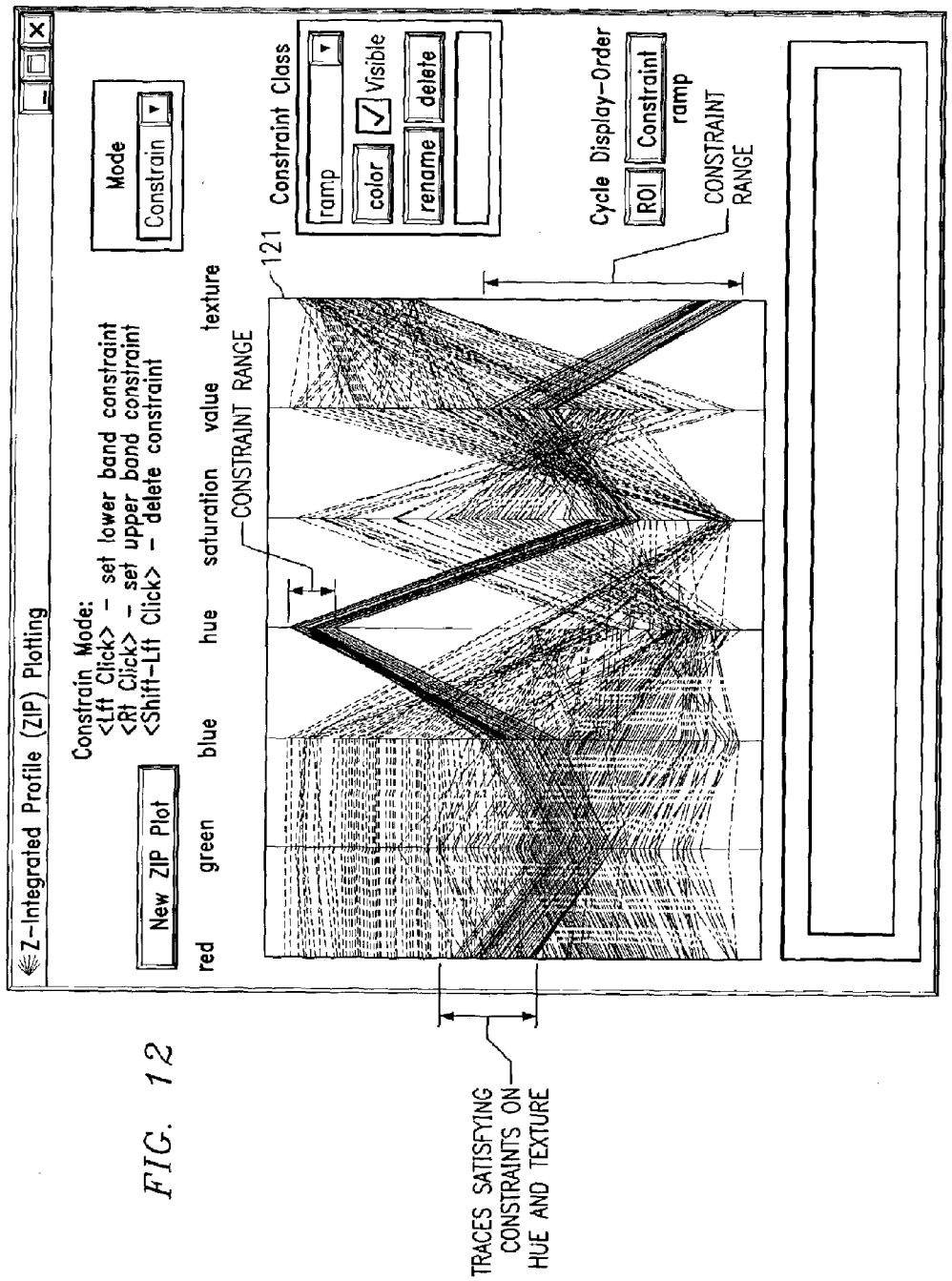
FIG. 12 illustrates the plot of FIG. 7, with the addition of a graphical display of both hue and texture constraints and pixel traces that satisfy both constraints.

FIG. 12 illustrates how it may be desirable to apply constraints on two or more axes simultaneously. Specifically, FIG. 12 illustrates the selection of constraints on two axes, one on the hue axis and one on the texture axis. In the ZIP plot 121, the combination of these two constraints continue to separate the ramp from the other regions of interest.

Figure 13:
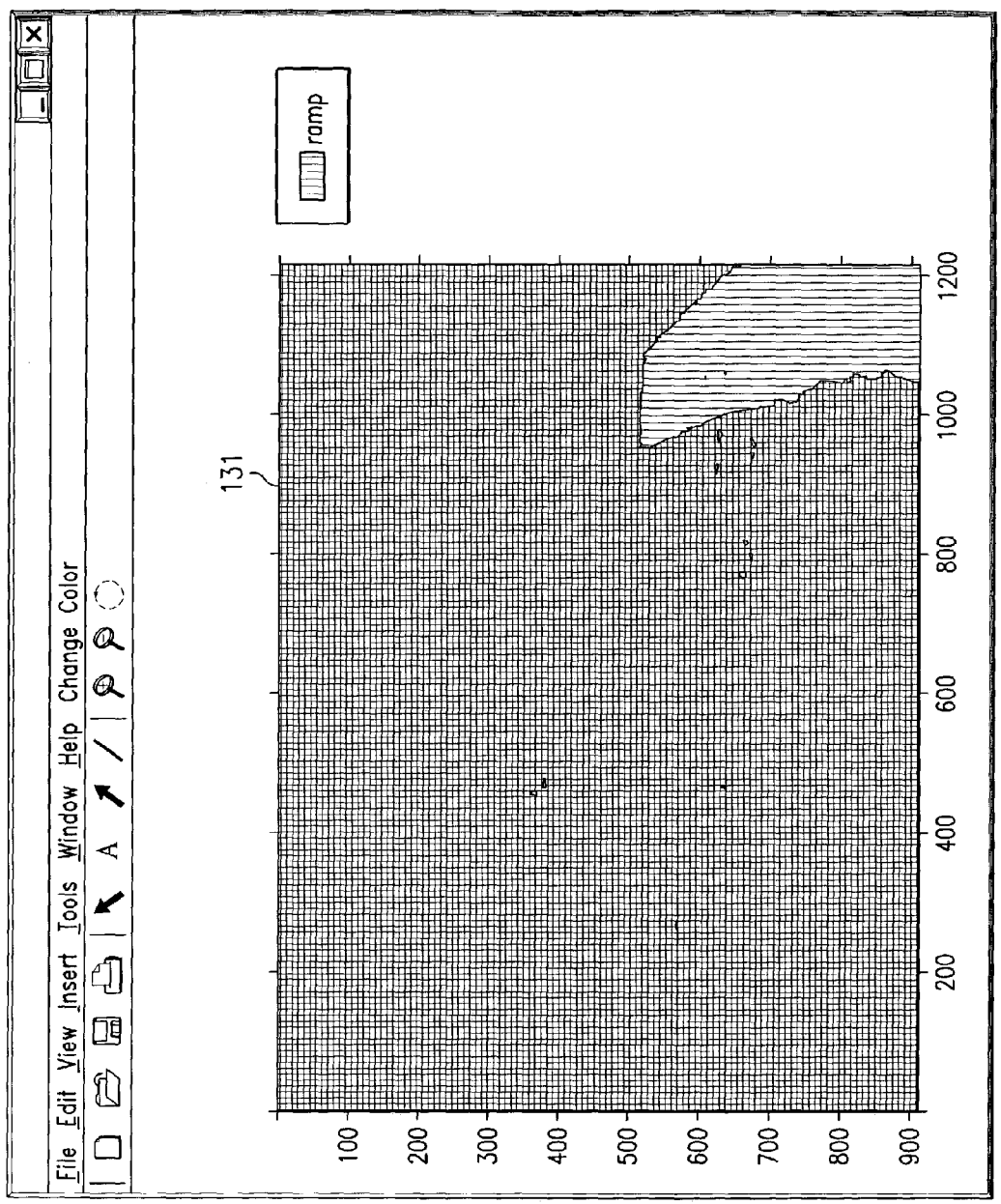
FIG. 13 illustrates the pixel image resulting from the constraints of FIG. 12.

FIG. 13 illustrates the pixel image 131 resulting from the application of the two constraints of FIG. 12. In this image, the ramp is well separated from the rest of the image. From a visual standpoint, it should be observed that the hypothesis produced by the constraints applied in FIG. 12 has been validated, since there appears to be good separation of the ramp from other objects in the scene.

Figure 14:
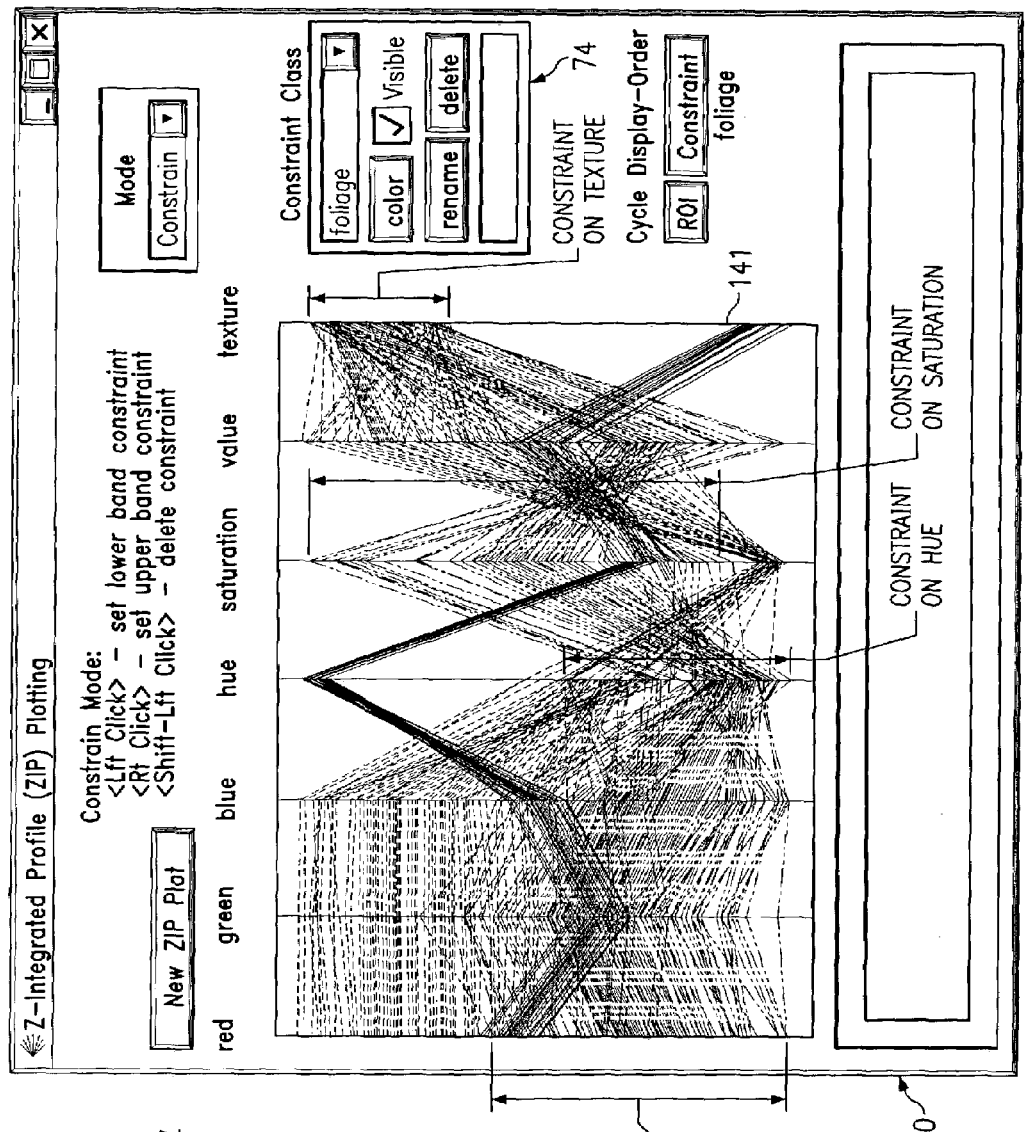
FIG. 14 illustrates the plot of FIG. 7, with the addition of a graphical display of hue, saturation, and texture constraints for a designated ROI class, and pixel traces that satisfy all constraints.

FIG. 14 illustrates constraints applied to three axes: hue, saturation, and texture. FIG. 14 further illustrates how GUI 70 may be used to distinguish between classes of constraints, where a "constraint class" is a set of constraints on a specified ROI. As indicated by the specified class in menu 74, the plot 141 is of a constraint class for foliage. The three constraints have each been selected so as to separate foliage from the other ROIs (the ramp and the gravel). By operating menu 74, the user may select another class for another ROI (here, the ramp or the gravel). The user could then apply one or more constraints to that class. The display 141 on GUI 70 could then be refreshed so as to highlight the pixel traces resulting from that constraint class.

Figure 15:
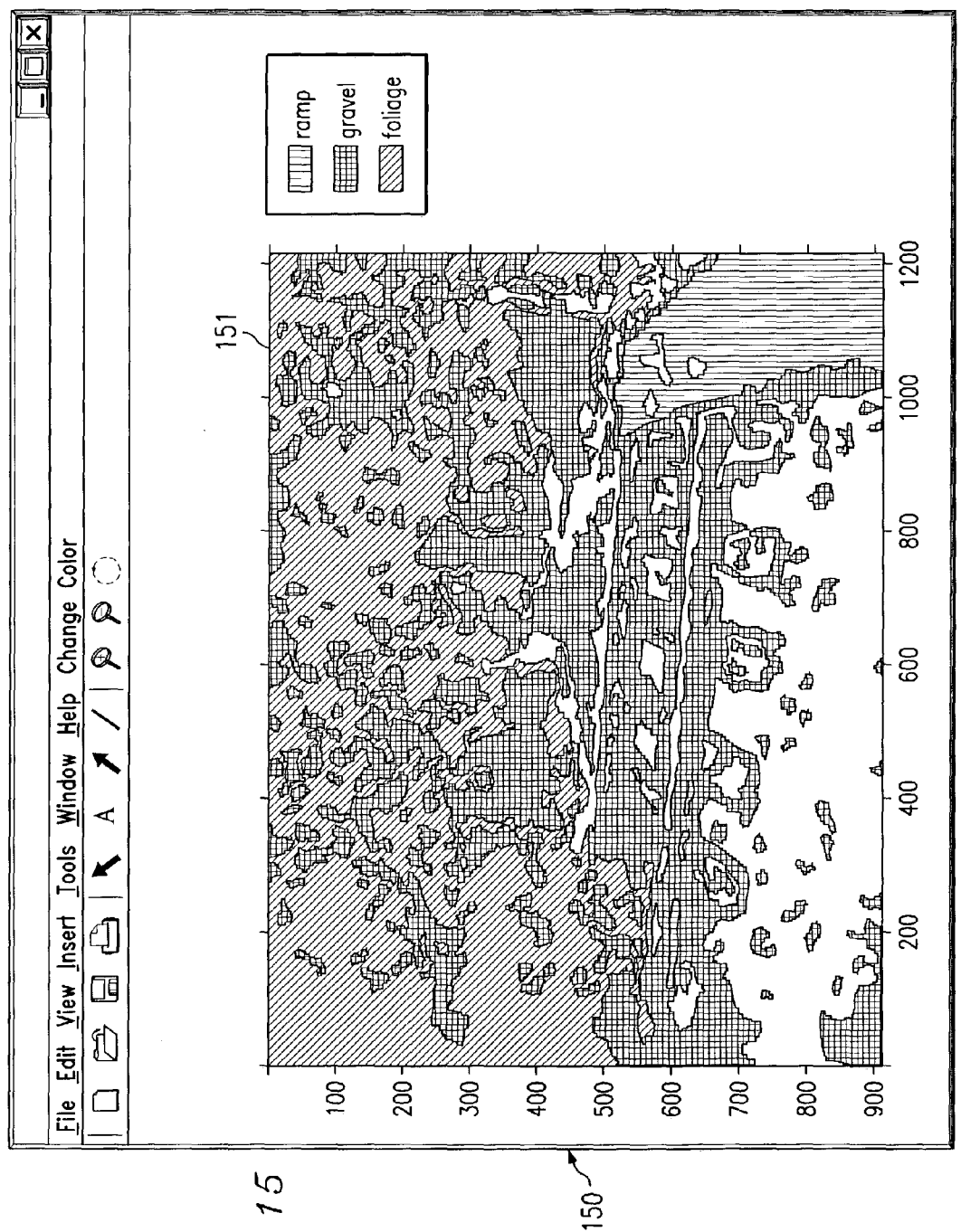
FIG. 15 illustrates the pixel image resulting from the constraints of FIG. 14, and also from three other ROI classes for the same constraints.

FIG. 15 illustrates a screen 150 containing the image 151 resulting from the application of constraints on three classes, where each class is for a different ROI. The result is good separation of the three classes. Each class is displayed in a different color.

Image 151 illustrates how classes of objects having pixels that satisfy the selected constraints may be "pulled out" from a scene. This is but one application of the method of the invention. It can be easily understood that any scene can have one or more ROIs, or that it may be important to separate objects that are not expected as well as objects that are expected.

From the above, it is apparent that if typical pixels contained in ROIs that are representative of the ramp, foliage, and gravel are rendered on a ZIP plot, traces such as those in FIG. 7 are produced. As indicated in FIGS. 8-15, with respect to the traces associated with the ramp, two effects are particularly noteworthy. First, if only RGB spaces were to be used, it would be difficult to differentiate ramp pixels from either foliage or gravel pixels since there is substantial overlap. However, if hue is used, the potential for separating ramp pixels from the other two classes becomes obvious from the ZIP plot due to the purity of the ramp's color. Furthermore, it is evident from the distributions on the texture axis of the ZIP plot that texture is also a potentially valuable axis to be considered since the ramp has low texture values and the foliage and gravel have higher texture values. Based on constraints imposed on three axes (hue, saturation, texture), it is possible to separate foliage, gravel, and ramp.

As further indicated above, and considering that each axis represents an image and that each image represents a different "sensor", a constraint in one image may be sufficient to separate two classes of objects (as represented by their ROIs). But as the scene becomes more complex, it may be necessary to constrain more than one image. Two classes may be separated from other classes in a first image but both have similar intensity values in that image. However, there may be a second image in which they do not have similar intensities. If constraints are applied to both images, the classes will be separated from each other. It may also be determined that none of the images are useful for separating the classes. In the latter case, it may be necessary to view new images and apply new constraints.

Quantitative Metrics

As described above, for any constraint or combination of constraints, visual feedback provides immediate verification whether the hypothesized axes and constraint ranges are effective for distinguishing pixels in ROIs. A combination of images and constraints may not be a unique solution; as explained below, statistical analysis can be used to find a "best" combination. For purposes of evaluating the separation of the classes produced by choosing images and constraints, a more formal method than visual inspection may be desired. Referring again to FIG. 3, at any point after a constraint is selected, Step 315 (statistical analysis) may be performed to evaluate the constraint.

One method of formally evaluating a hypothesized combination of sensors (each represented by an image and an axis) is to use statistical analysis to examine the separations of the classes that are produced by applying constraints. In the example of this description, the statistical method makes use of Mahalanobis ellipses. In essence, this method is based on computing ellipses whose orientations and sizes are functions of the eigenvectors and eigenvalues of the covariance matrices of each constraint class. Measures of effectiveness of sensor combinations may, therefore, be based on the separations of constraint class means using Mahalanobis distances.

Figure 16:
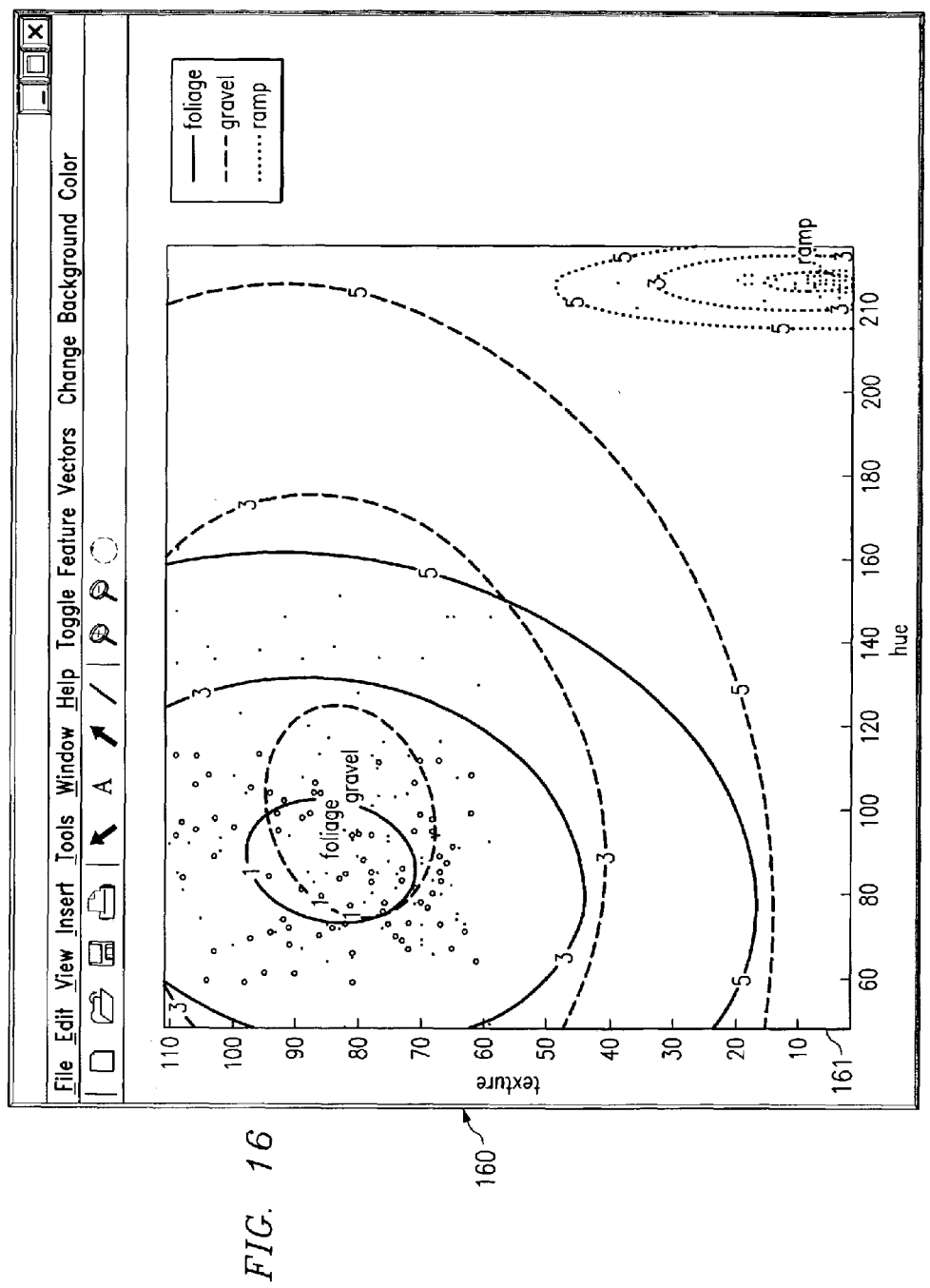
FIG. 16 illustrates a two dimensional Mahalanobis plot for the two constraints on the plot of FIG. 12.

FIG. 16 is a screen 160 with a display 161 of a two dimensional Mahalanobis plot. The selected axes are hue and texture for the same three classes of objects as were analyzed in FIGS. 7-15. In FIG. 16, Mahalanobis ellipses at distances of 1, 3, and 5 are shown. The textured classes (foliage and gravel) are substantially separated from the smooth class (ramp). If desired, calculations of the separations between classes could be performed and the Mahalanobis distance values displayed. High values for Mahalanobis distances indicate that a particular sensor combination provides robust separation. Thus, display 161 indicates that the sensor combinations for hue and texture may be used to separate the ramp from the other ROIs, but not to separate the foliage from gravel.

Figure 17:
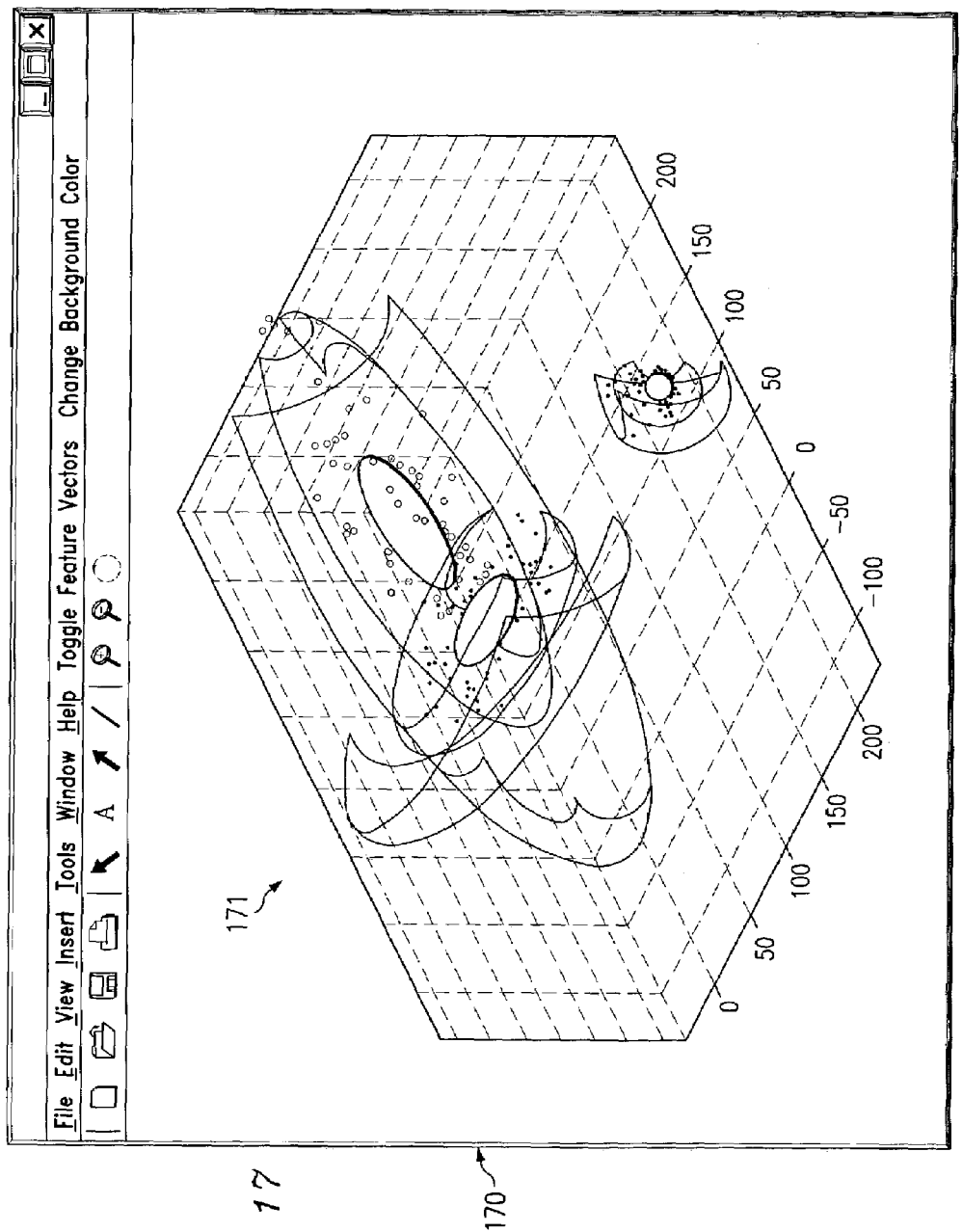
FIG. 17 illustrates a three dimensional Mahalanobis plot for the three constraints on the plot of FIG. 14.
Figure 19:
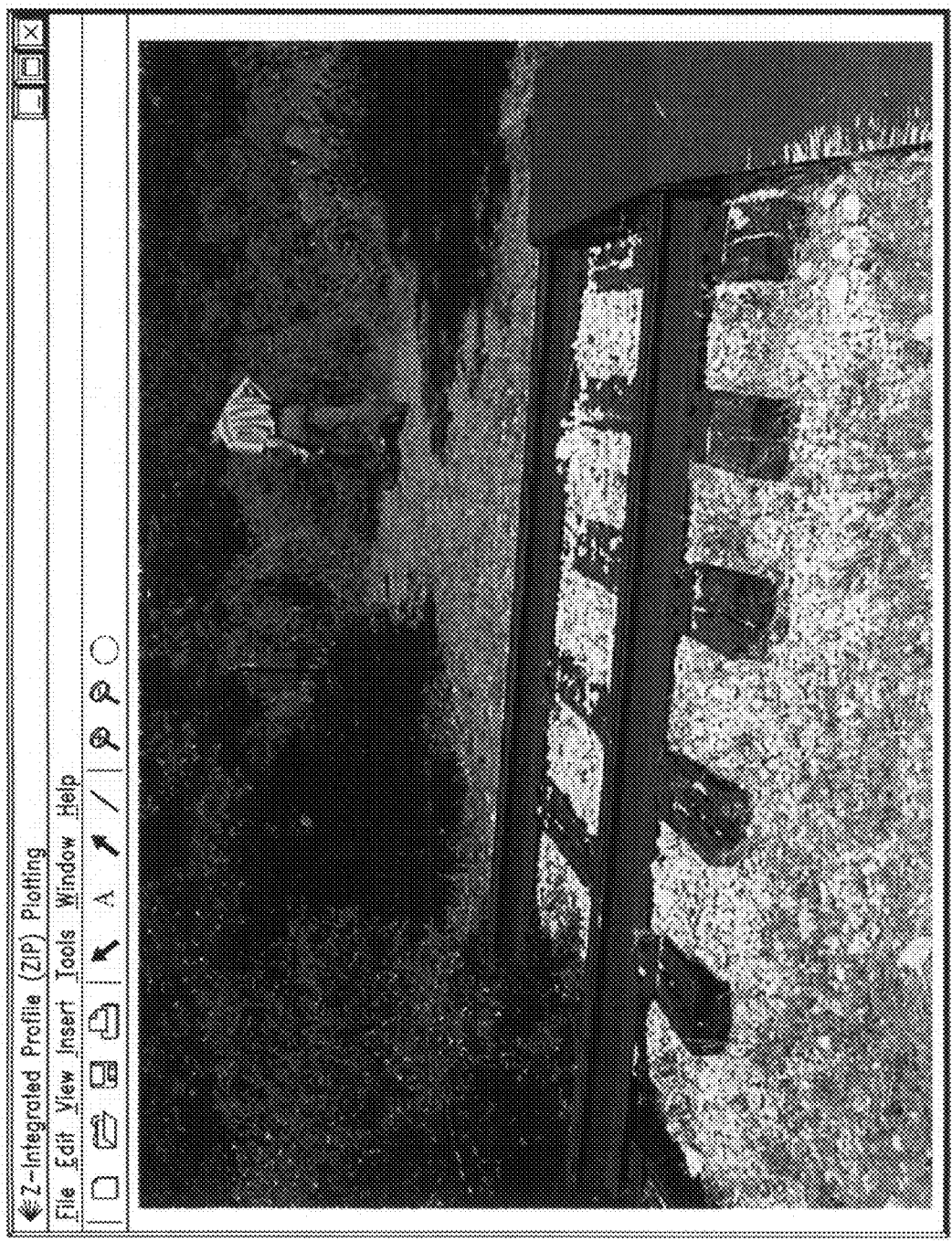
FIGS. 19-32 are color illustrations corresponding to FIGS. 1, 5, 6, and 7-17, respectively.
Figure 20:
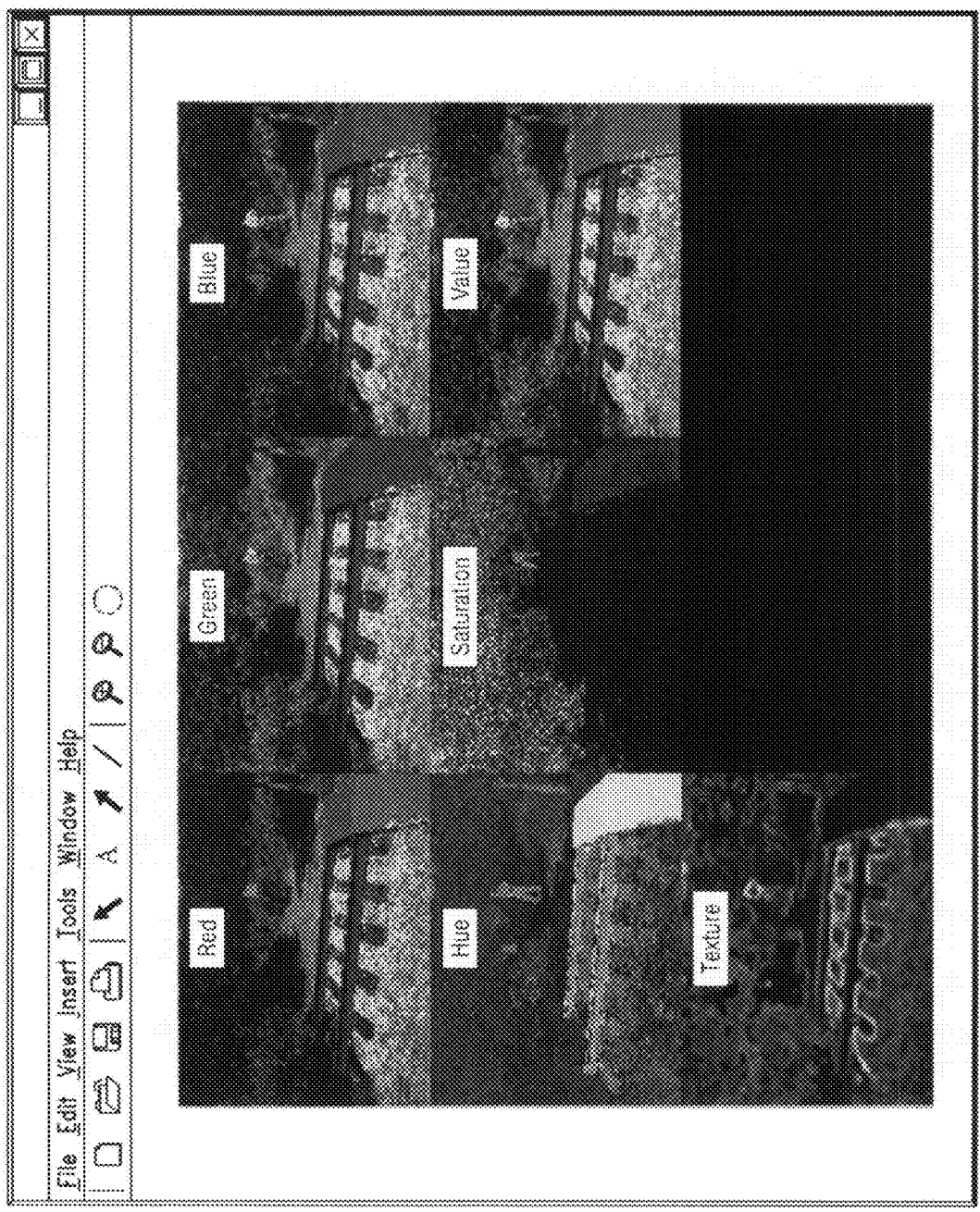
Figure 21:
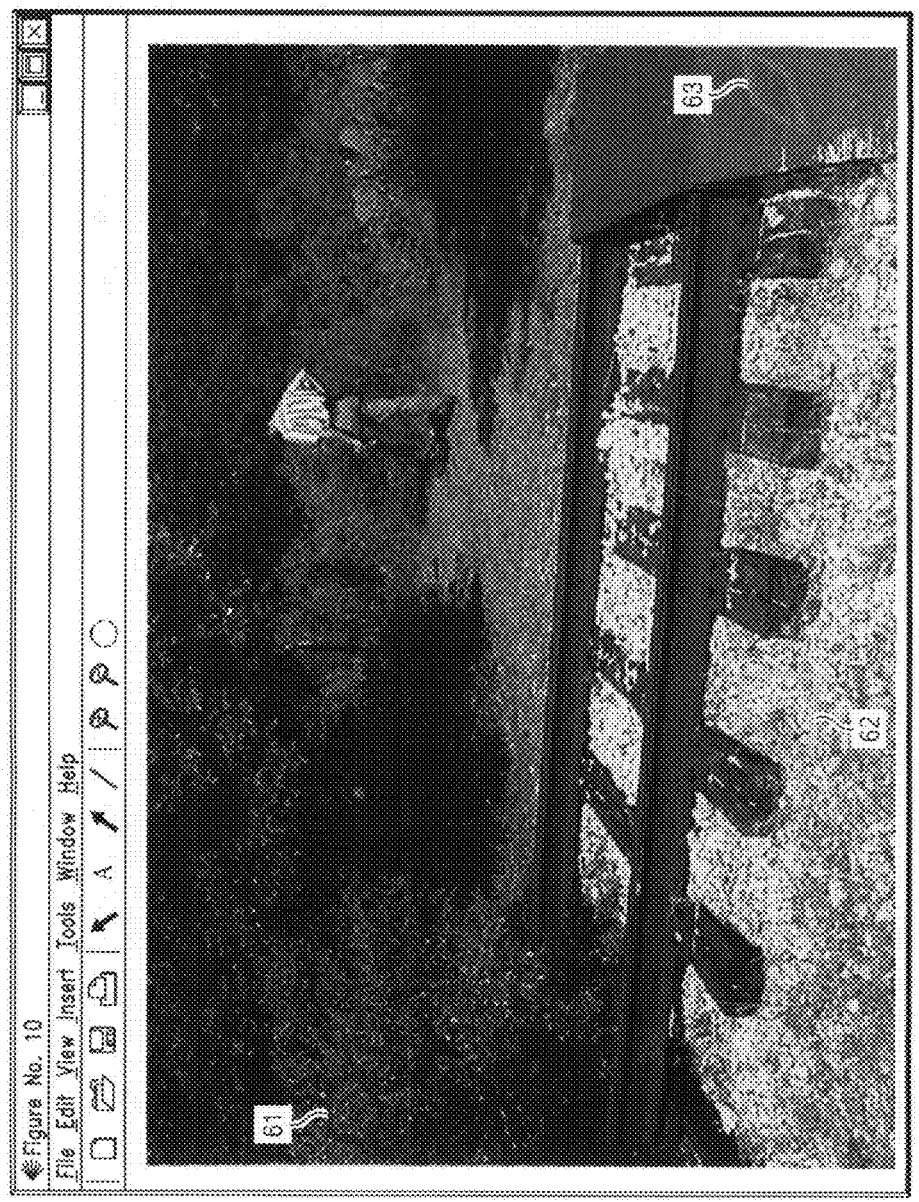
Figure 22:
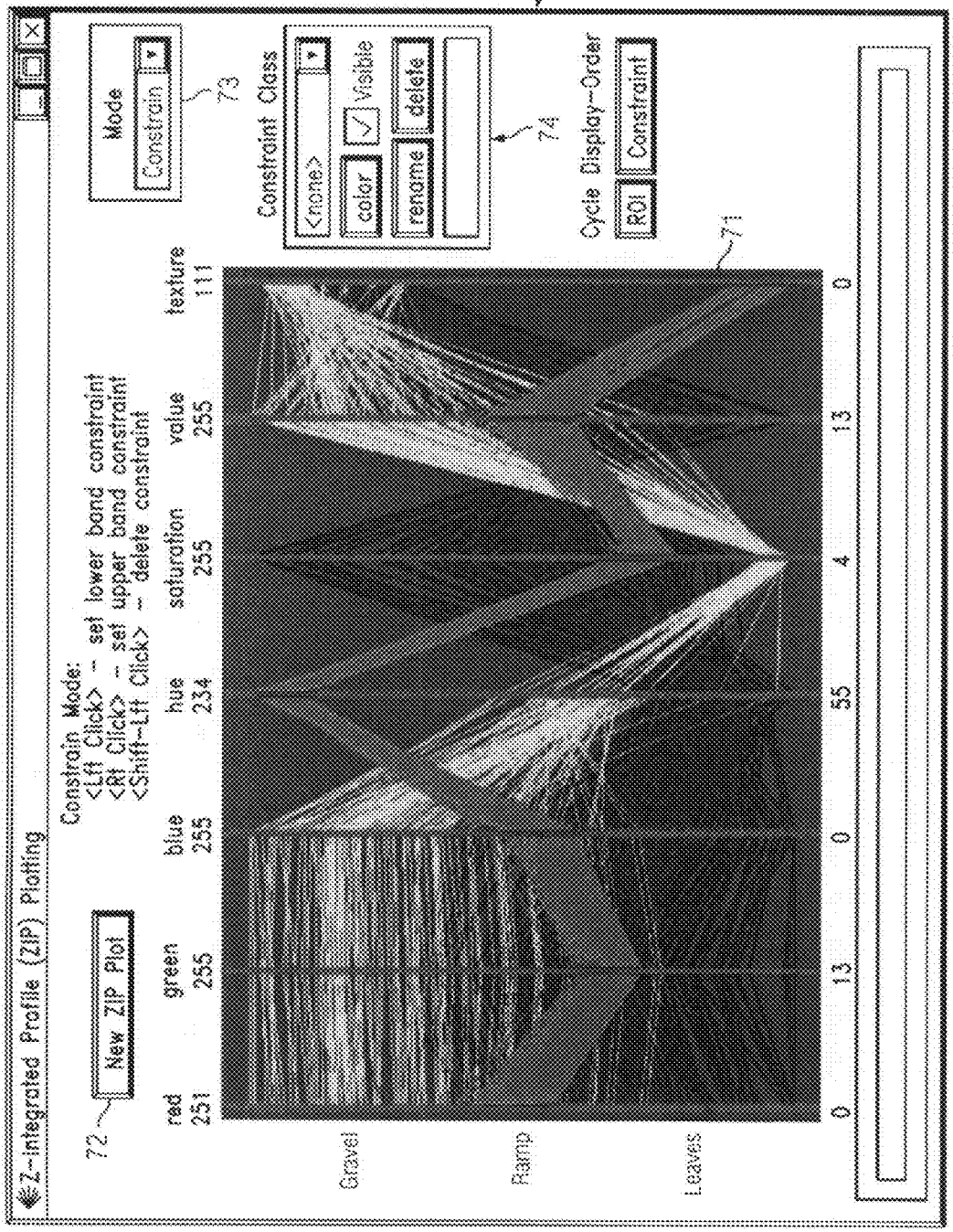
Figure 23:
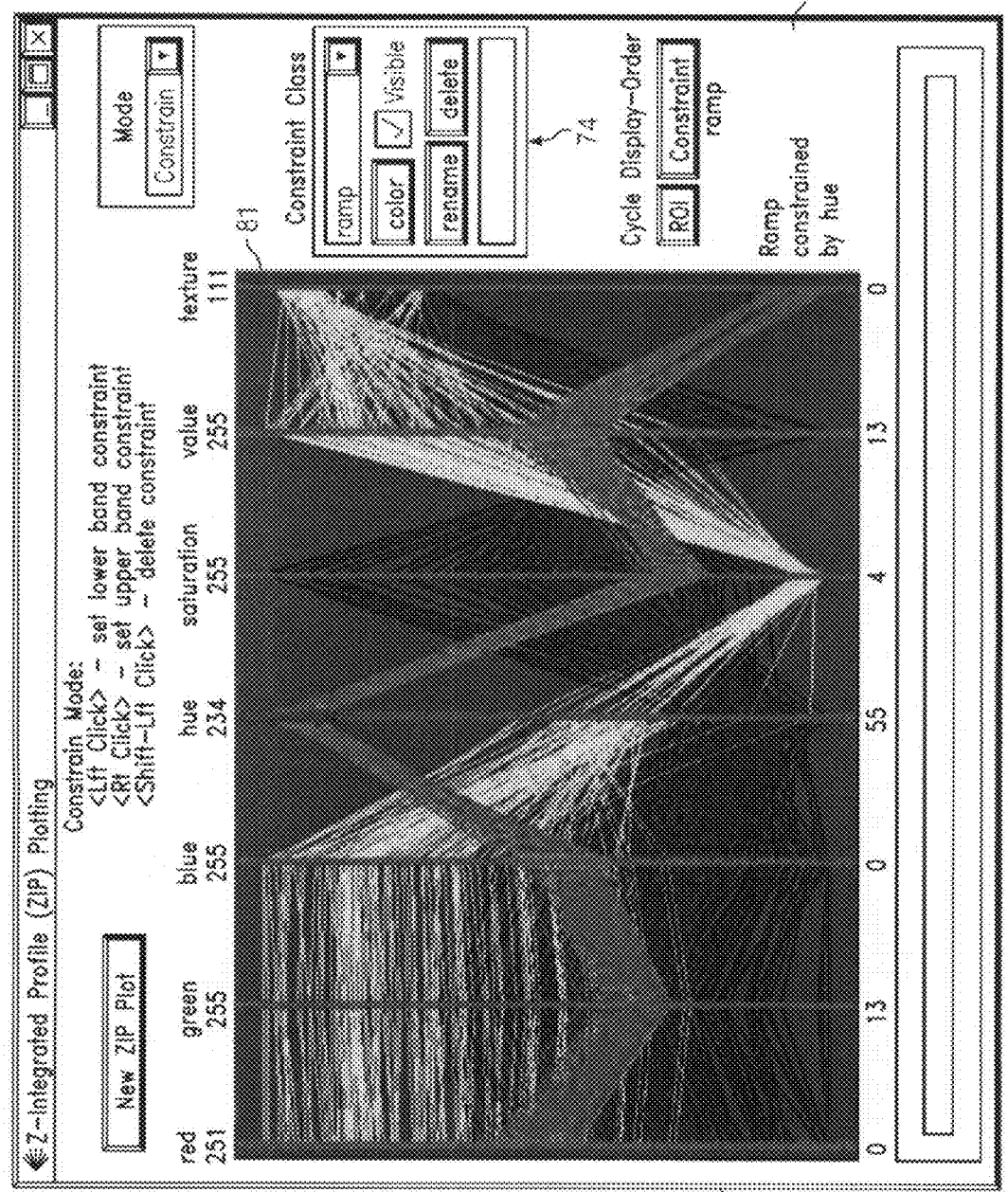
Figure 24:
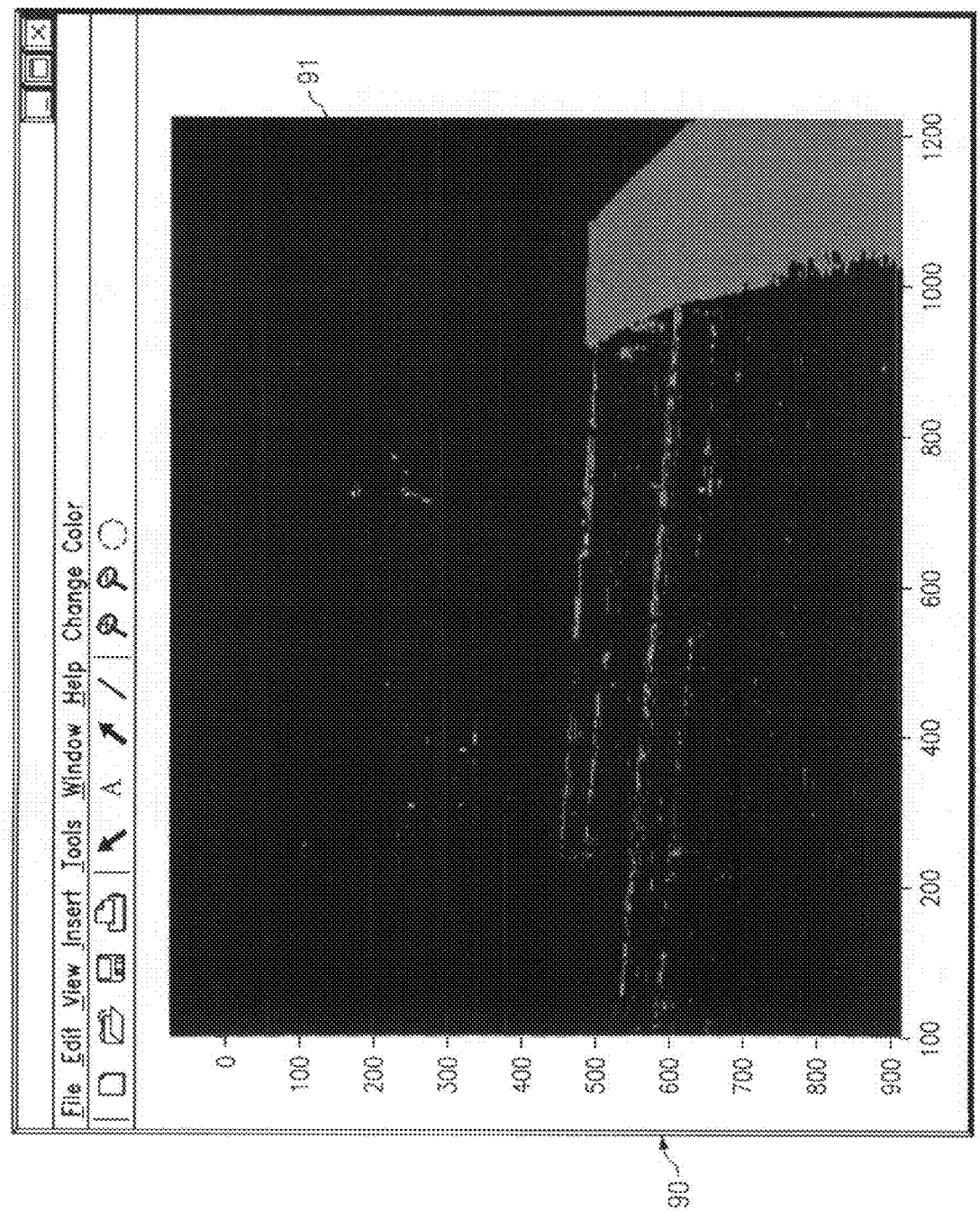
Figure 25:
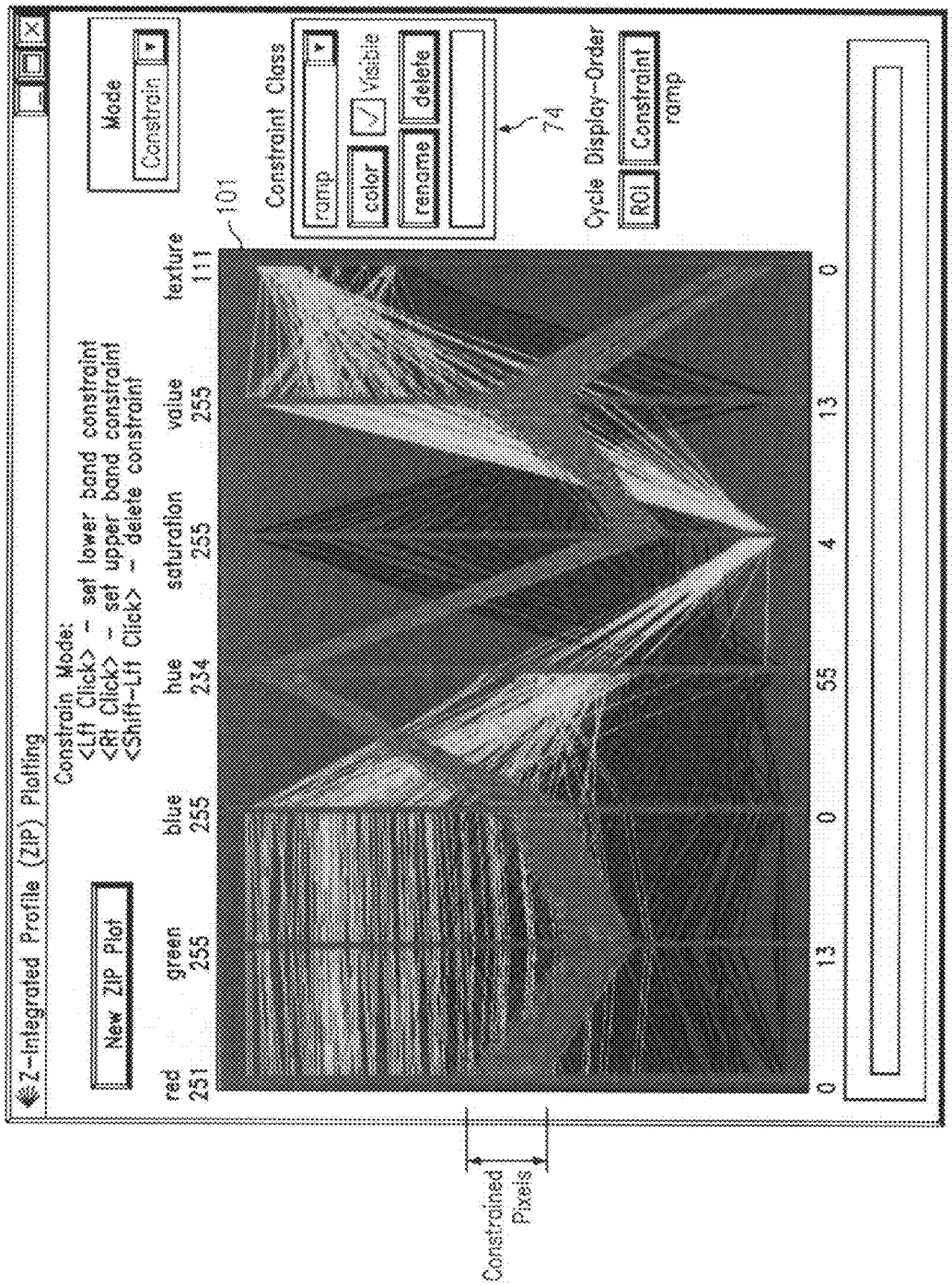
Figure 26:
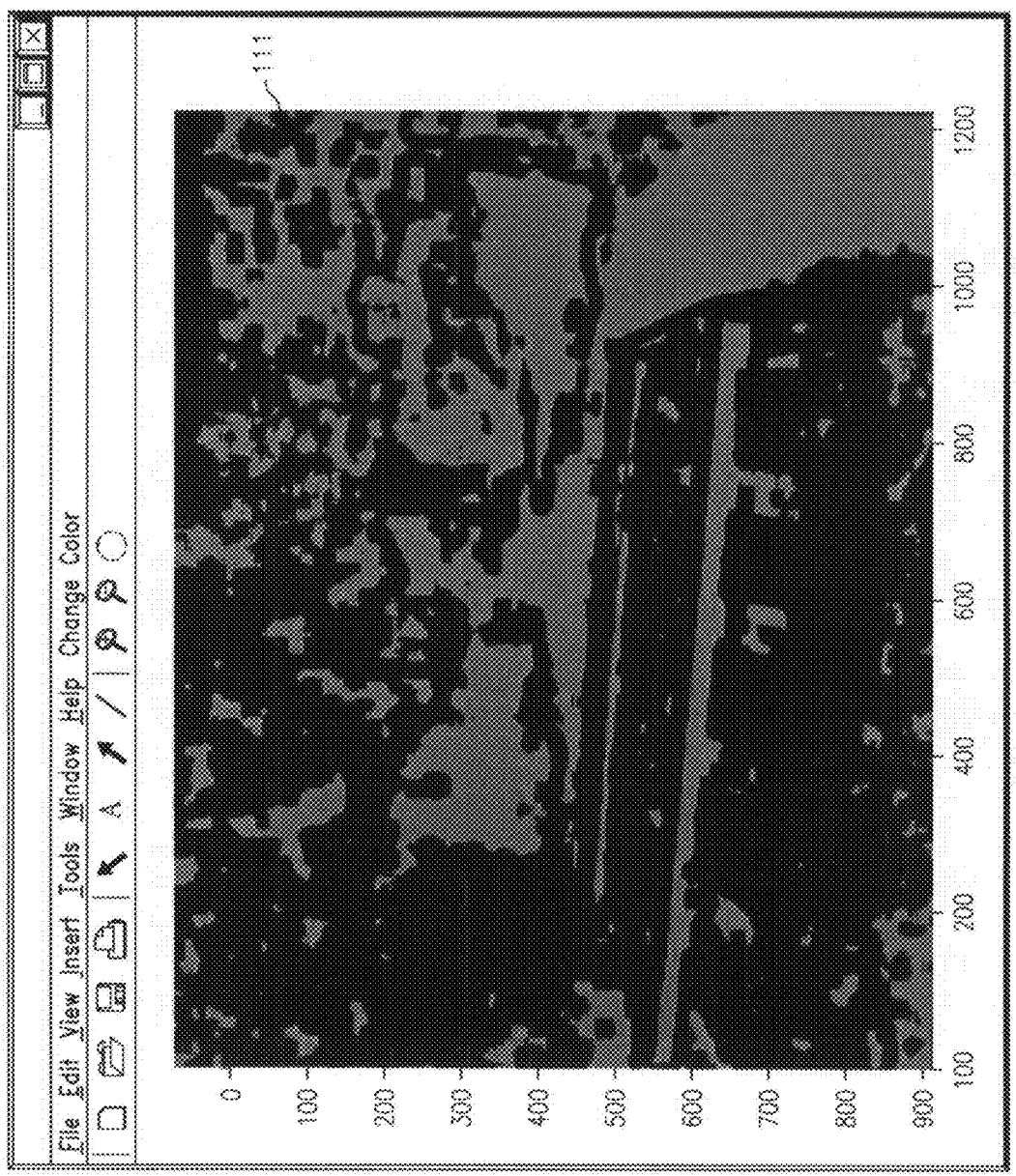
Figure 27:
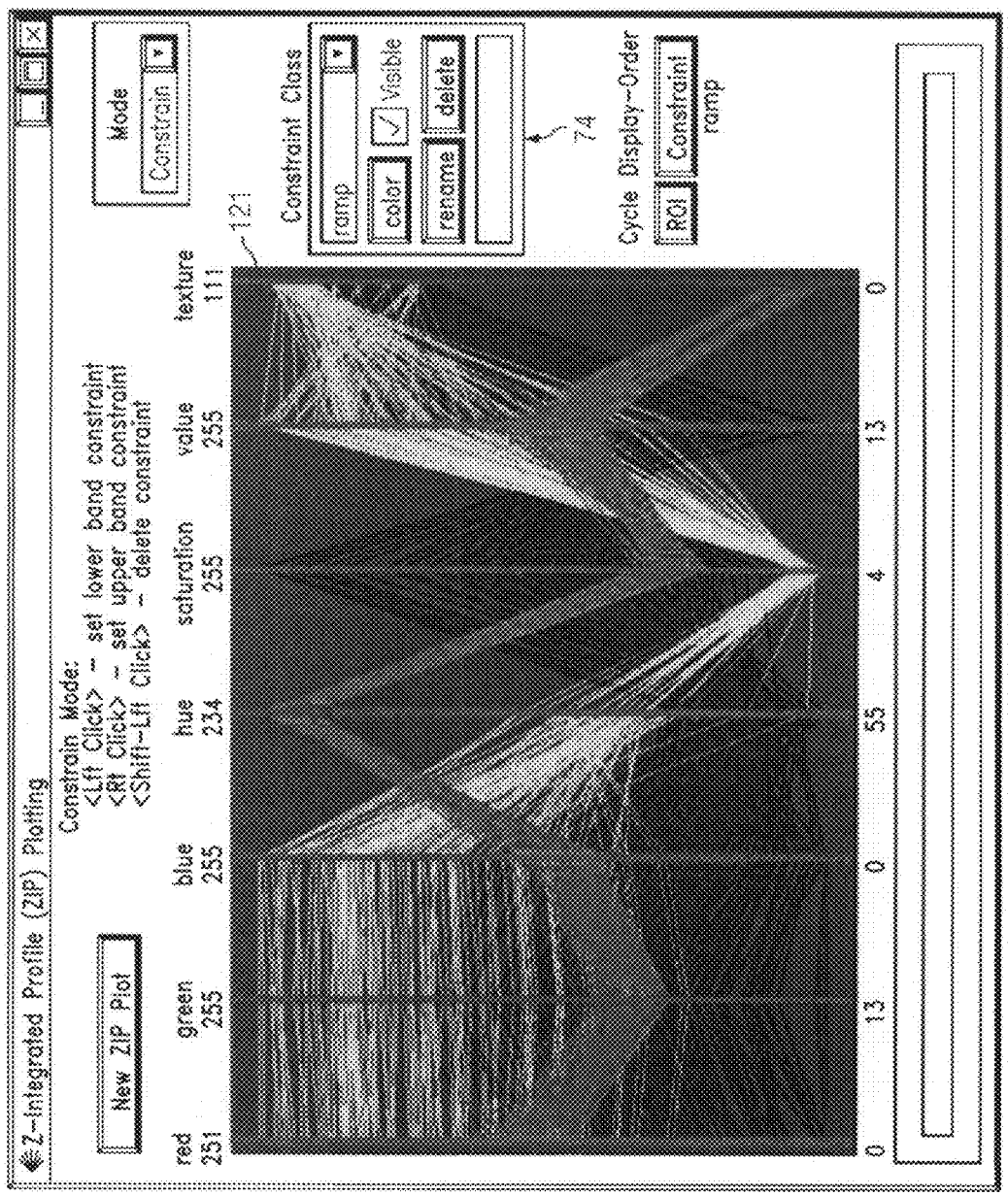
Figure 28:
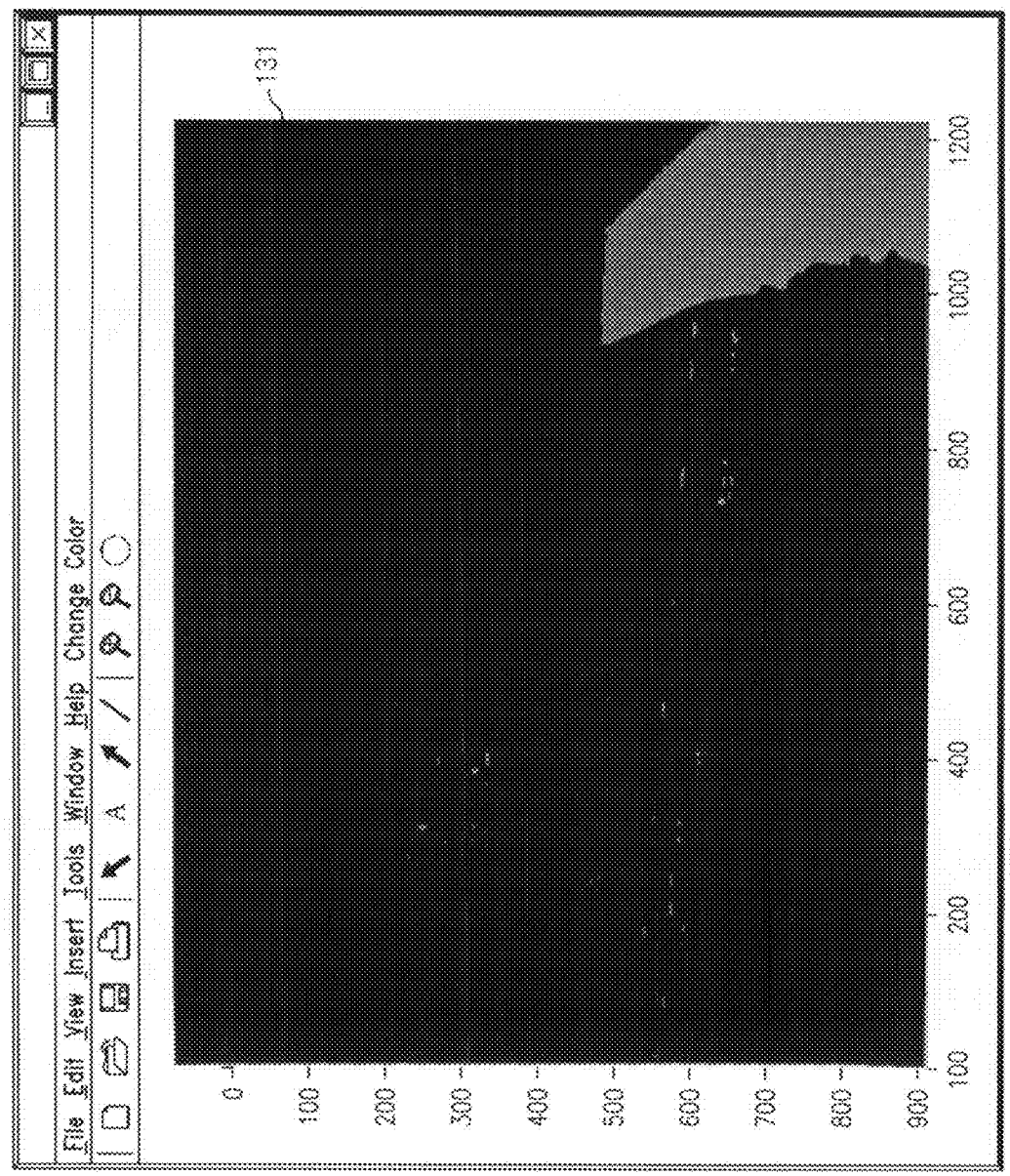
Figure 29:
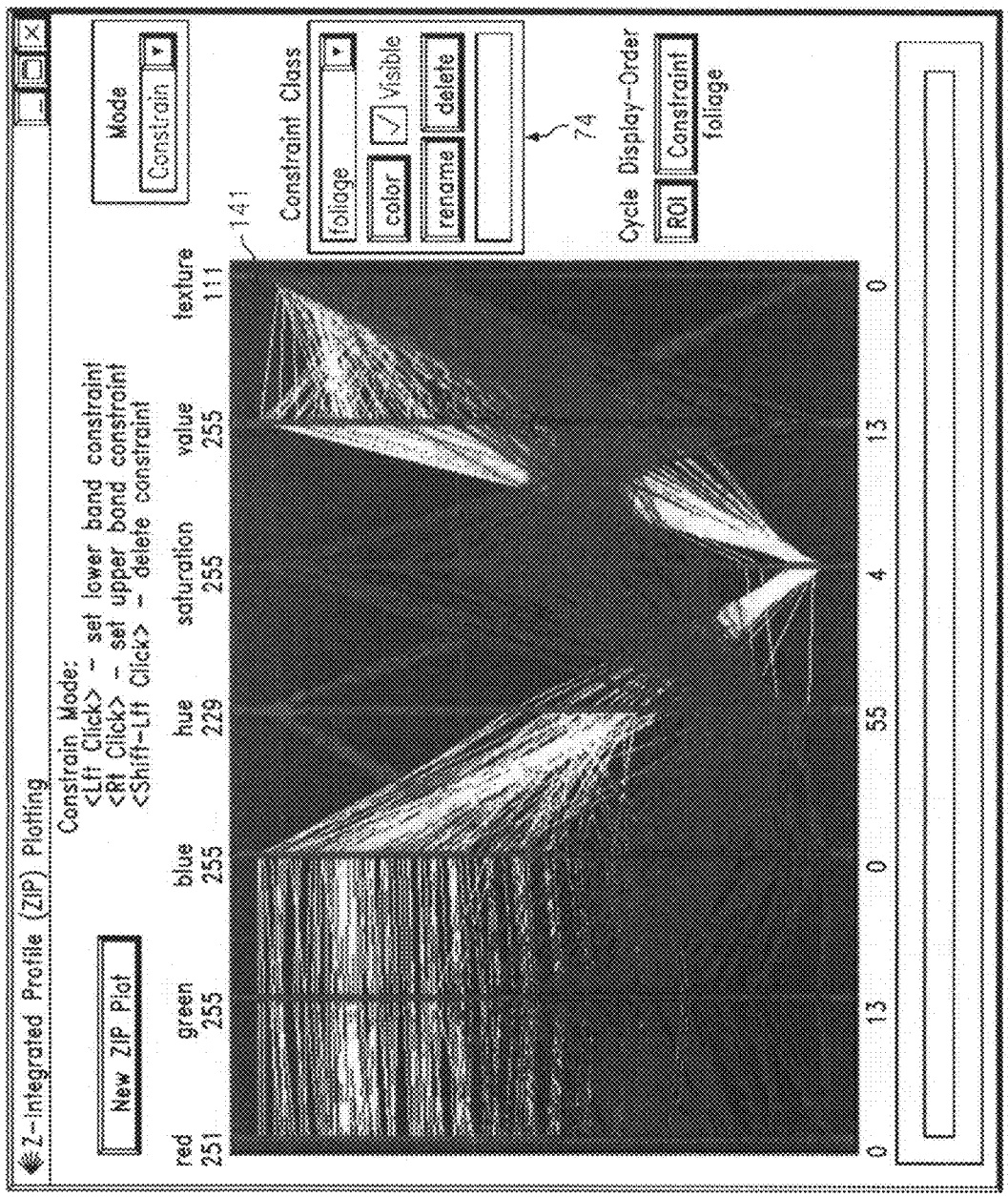
Figure 30:
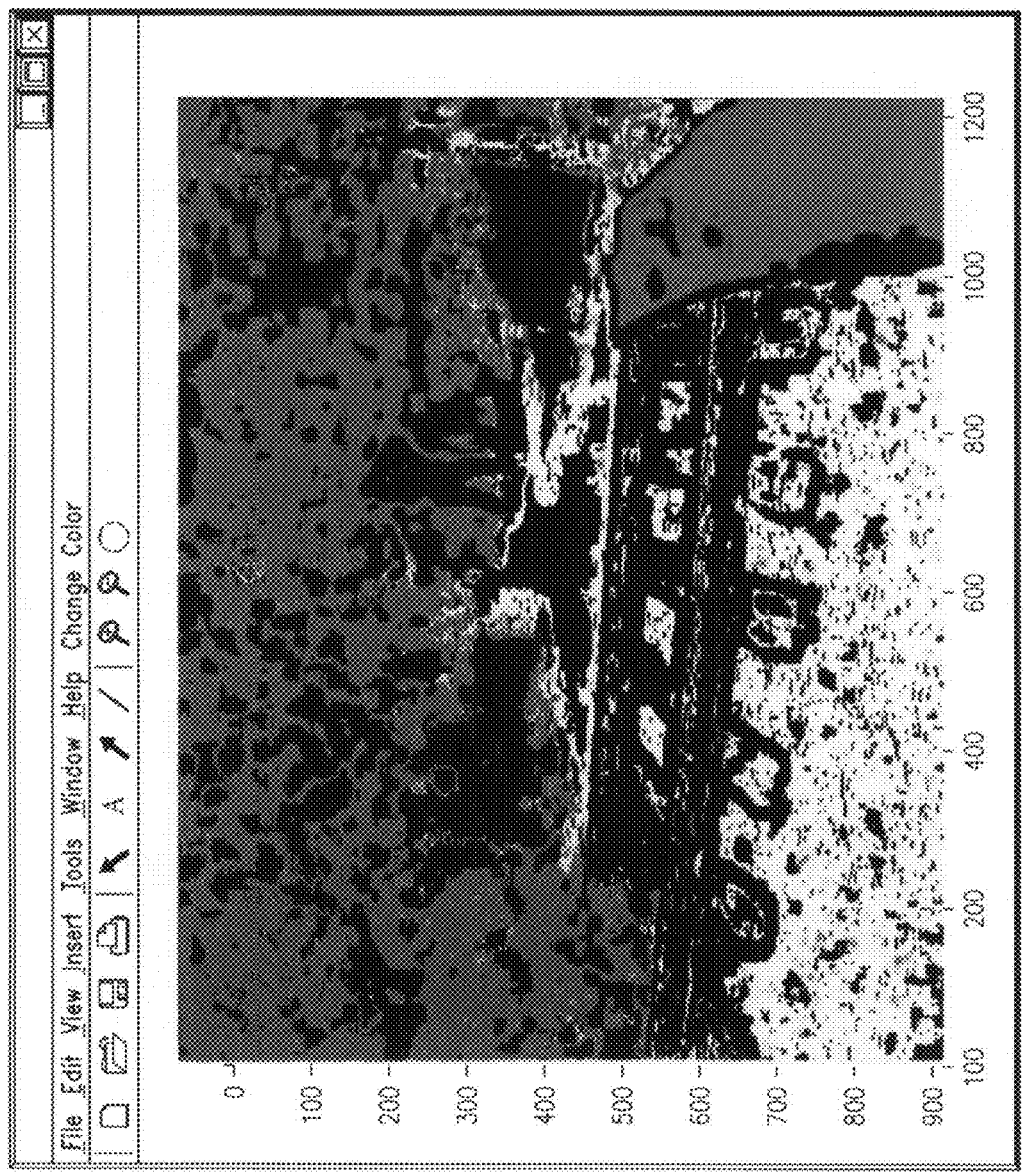
Figure 31:
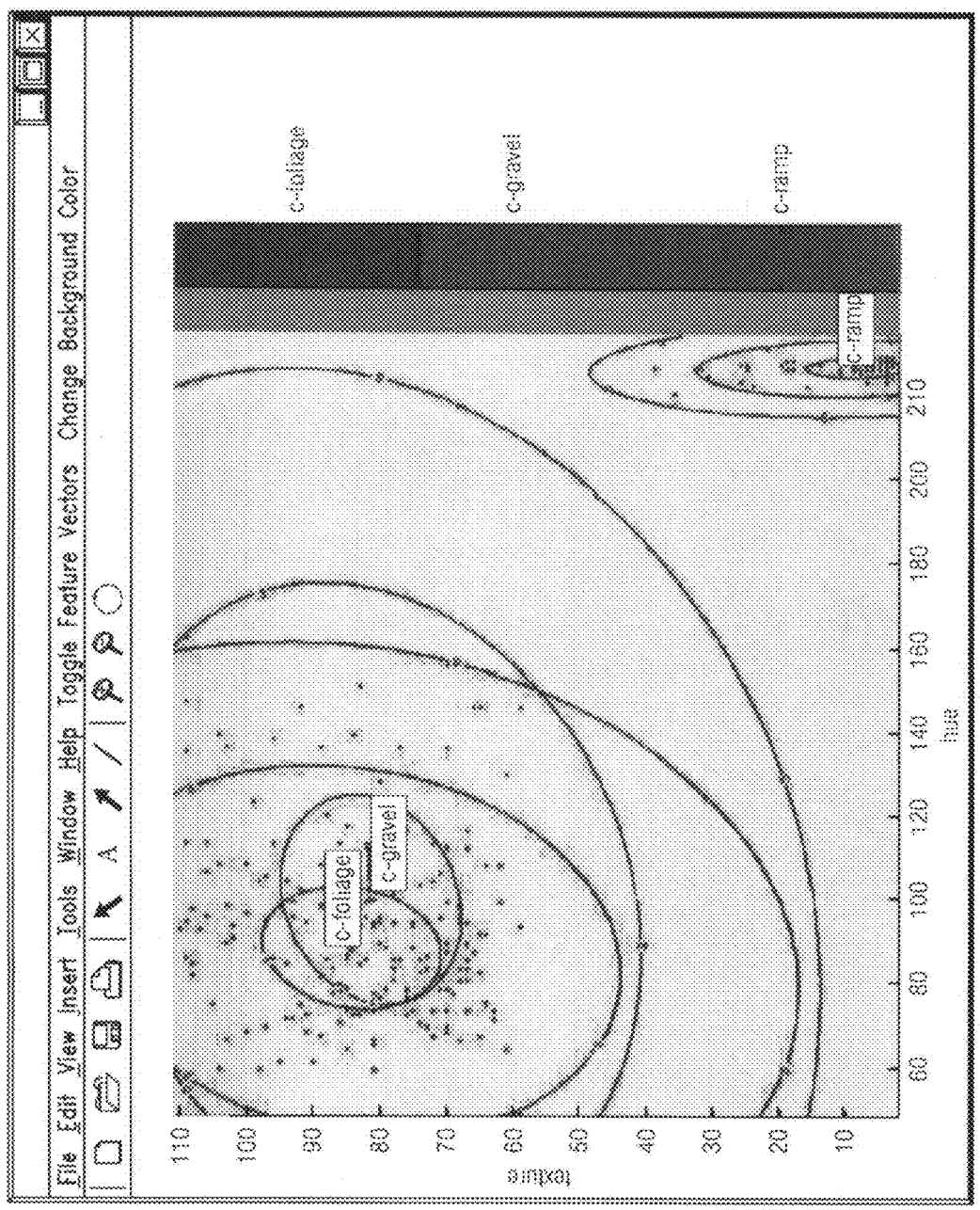
Figure 32:
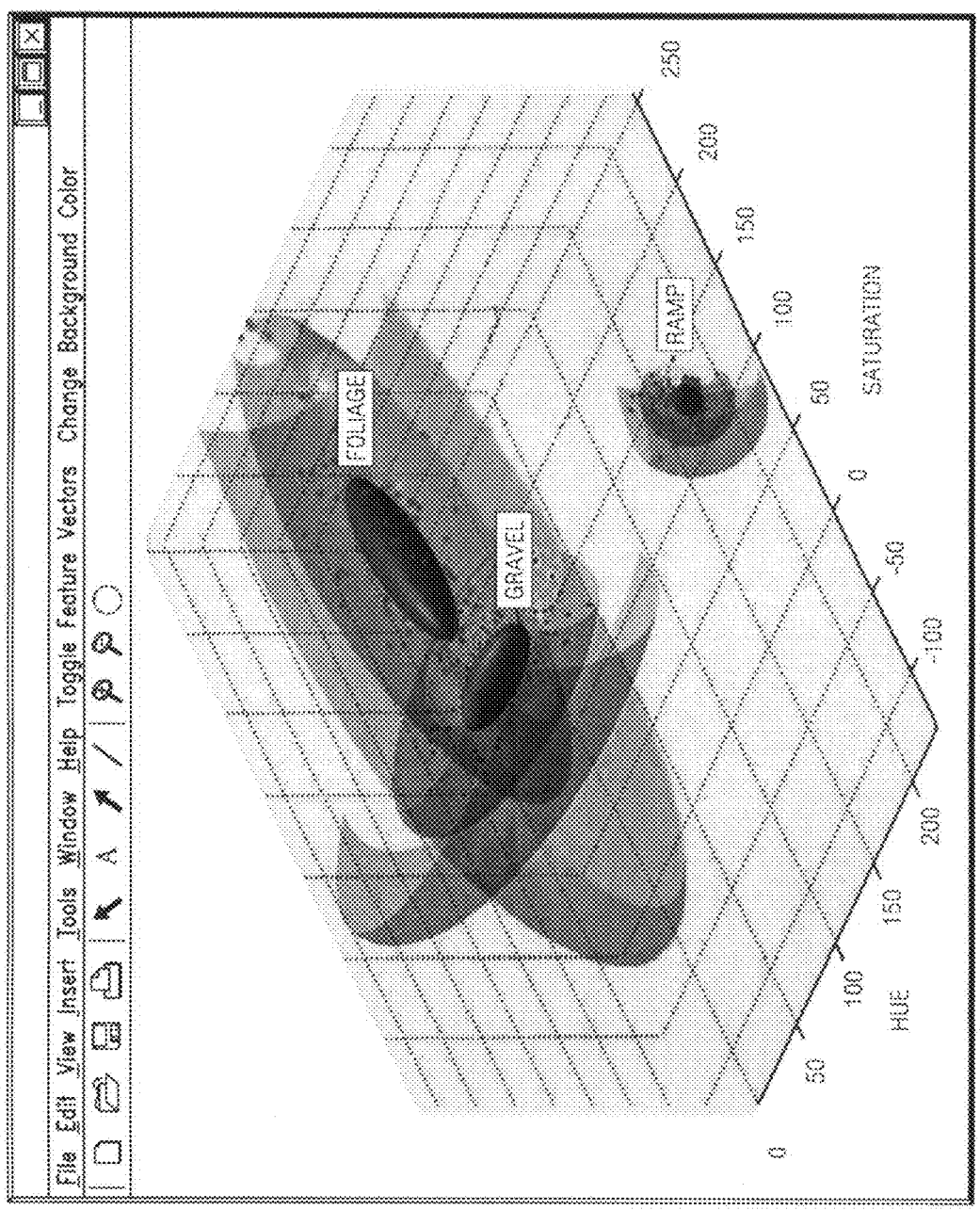

In FIG. 17, the user has selected three images for analysis, which are hue, saturation, and texture. The resulting display 171 is a three dimensional Mahalanobis plot. With the selection of three sensors, good separation between the ramp, foliage, and gravel is indicated.

FIG. 18 illustrates quantitative metrics produced as the result of the images and constraints illustrated in FIG. 17. Each row represents the distance from the mean feature vector for an individual class to the mean feature vectors of the other classes. For example, the Mahalanobis distance from the mean vector for the foliage class to the gravel class is 2.540, a value that is substantially lower than the other inter-class mean distances. The reason for this may be inferred by examining the plot 171 and noting that that there is substantial overlap among hue and texture values, with the best separation occurring along the saturation axis.

Mahalanobis analysis may be used to indicate the quality of separation based on the images and constraints selected. For example, it can be predicted whether, if the spectral characteristics of objects are shifted slightly, good separation will remain. In other embodiments, statistical methods based on conditional probabilities or minimizing the probability of classification error could be used, or measures such as the Euclidean distance between feature class means, the cosine of the angle between vectors to the feature class means, or the Tanimoto measure between feature class means could be used.

In various embodiments of the invention, the results of the statistical analysis may be displayed graphically as in FIGS. 16 and 17 or textually as in FIG. 18 or using some combination of these types of displays. Also, as explained above, the extent to which the processing of FIG. 3 is interactive is optional. Various pixel renderings and statistical analysis displays may be optional. For example, as indicated above in connection with FIG. 7, a particular axis or axes could be selected, and the whole process of attempting and evaluating constraints could be automated.

CONCLUSIONS

The above described method facilitates evaluating the effectiveness of combinations of sensors (which sense spectral band images or other images and may be used to obtain derived images) as applied to various scenarios. The method provides users with interactive visual and quantitative mechanisms in order to gain insights that make it straightforward to hypothesize effective combinations and to evaluate the potential performance of these combinations. The method has been successfully applied to multi-spectral imagery as well as to imagery with derived features.

The above-described example of identifying objects in a scene is but one example of applications of the invention. In that example, the primary focus was on determining what combination of images, from one or more types of sensors, could be best used to identify a particular object. As indicated above, the same concepts may be used to identify patterns in a scene. For example, in images taken high above the earth, a particular pattern might indicate the presence of insect infestations, crops or minerals. By using field observation, a geographic area in which the presence of any of these features (such as insects, crops or minerals) could be located on the earth. A pattern in an image with a known feature could then be identified as a ROI, isolated using the above described methods, and compared to images acquired from a suspected or arbitrary location to determine if that location also exhibits this pattern.

It is also possible that, given a group of sensors or images, the primary focus could be on selecting the constraints that will best result in a desired image. However, the function of the above-described methods and systems may be generally described as interactively analyzing a set of images from one or more sensors (where a "sensor" is any device that acquires a spatial set of pixel data).

OTHER EMBODIMENTS

Although the present invention has been described in detail, it should be understood that various changes, substitutions, and alterations can be made hereto without departing from the spirit and scope of the invention as defined by the appended claims.

What is claimed is:

1. A method of using a computer to separate an object or pattern in a scene, comprising the steps of:
  acquiring two or more images of the scene, each image from a different sensor, spectral band, or recording medium, and each image being comprised of a set of pixels, each pixel having intensity values;
  defining at least one region of interest (ROI) in the scene, each ROI comprising a subset of the pixels;
  displaying a parallel axis plot representing pixel traces of intensity values of each image, wherein the pixel traces are from at least two ROIs, and wherein each of the images is represented as an axis on the plot, and wherein each pixel trace is traced across the axes;
  wherein multiple pixel traces for one ROI are differentiated from multiple pixel traces of another ROI by color;
  graphically constraining an axis of the plot by selecting a range of intensity values on that axis; and
  graphically identifying, on the parallel axis plot, the pixel traces that satisfy the constraint.

2. The method of claim 1, wherein at least one of the sensors is a spectral band sensor.

3. The method of claim 1, wherein the sensors are elements of a multispectral image system.

4. The method of claim 1, wherein the sensors are elements of a hyperspectral image system.

5. The method of claim 1, wherein the sensors are RGB sensors.

6. The method of claim 1, wherein one or more of the images is a primary image from a sensor.

7. The method of claim 1, wherein one or more of the images is a derived image from a sensor.

8. The method of claim 7, wherein the images are from the group: hue, saturation, value, or texture.

9. The method of claim 1, wherein the defining step is performed by displaying an image of the scene and selecting a portion of that image.

10. The method of claim 9, wherein the selecting step is performed by drawing a closed region to define the ROI.

11. The method of claim 1, wherein two or more ROIs are defined and wherein the identifying step is performed by coloring the pixel traces for each ROI in a different color.

12. The method of claim 1, further comprising the step of identifying, on the parallel axis plot, the range of the constraint on the associated axis.

13. The method of claim 1, wherein the displaying step is performed by containing the image within a graphical user interface screen, the graphic user interface screen having means for interactively defining the constraint.

14. The method of claim 1, further comprising the step of transforming one or more of the images to a different intensity scale.

15. The method of claim 1, further comprising the step, performed after the displaying step, of displaying a pixel image of pixels satisfying the constraint.

16. The method of claim 1, further comprising the step of repeating the constraining and identifying steps such that pixel traces satisfying multiple constraints are identified.

17. The method of claim 1, further comprising the step of classifying constraints by ROIs, such that the identifying step may be repeated for different classes of constraints.

18. The method of claim 1, further comprising the step of statistically evaluating the results of one or more constraints.

19. The method of claim 18, wherein the evaluating step is performed using Mahalanobis ellipses.

20. The method of claim 18, further comprising the step of displaying a graphical representation of the results of the evaluating step.

21. The method of claim 18, further comprising the step of displaying a numerical representation of the results of the evaluating step.

22. The method of claim 1, wherein at least one of the sensors is from the group: magnetic field sensor, gravitational field sensor, temperature sensor, or pressure sensor.

23. A method of using a computer to separate an object or pattern in a scene, comprising the steps of:
  acquiring two or more images of the scene, each image from a different sensor, and each image being comprised of a set of pixels, each pixel having an intensity value;
  defining at least one region of interest (ROI) in the scene, each ROI comprising a set of pixels;
  displaying a parallel axis plot representing pixel traces of intensity values of each image, wherein the pixel traces are from at least two ROIs, and wherein each of the images is represented as an axis on the plot, and wherein and each pixel trace is traced across the axes;
  wherein multiple pixel traces for one ROI are differentiated from multiple pixel traces of another ROI by color;
  graphically constraining an axis of the plot by selecting a range of intensity values on that axis; and
  statistically determining whether any image provides a separated view of the ROI, based on the results of the constraining step.

24. The method of claim 23, further comprising the step of graphically identifying, on the parallel axis plot, the pixel traces that satisfy the constraint.

25. The method of claim 23, further comprising the step, performed after the displaying step, of displaying a pixel image of pixels satisfying the constraint.

26. The method of claim 23, further comprising the step of displaying a graphical representation of the results of the evaluating step.

27. The method of claim 23, further comprising the step of displaying a numerical representation of the results of the evaluating step.

28. A computer system for aiding a user in separating an object or pattern in a scene, comprising:
  an image importation and display module for acquiring two or more images of the scene, each image from a different sensor, and each image being comprised of a set of pixels, each pixel having intensity values; for receiving input from the user that defines at least one region of interest (ROI) in the scene, each ROI comprising a subset of the pixels; and for computing vectors for pixels in the ROI;
  a plotting module for displaying a parallel axis plot representing pixel traces of intensity values of each image, wherein the pixel traces are from at least two ROIs, and wherein each of the images is represented as an axis on the plot, and wherein and each pixel trace is traced across the axes, with the pixel traces associated with one ROI being differently colored than pixel traces from other ROIs;

for receiving input from a user that represents at least one constraint on an axis of the plot by selecting a range of intensity values on that axis; and for graphically identifying, on the parallel axis plot, the pixel traces that satisfy each constraint; and a quantitative analysis module for statistically evaluating the results of any constraints.

29. The system of claim 28, wherein at least one of the sensors is a spectral band sensor.

30. The system of claim 28, wherein the sensors are elements of a multispectral image system.

31. The system of claim 28, wherein the sensors are elements of a hyperspectral image system.

32. The system of claim 28, wherein the sensors are RGB sensors.

33. The system of claim 28, wherein one or more of the images is a primary image from a sensor.

34. The system of claim 28, wherein one or more of the images is a derived image from a sensor.

35. The system of claim 34, wherein the images are from the group: hue, saturation, value, or texture.

36. The system of claim 28, wherein the image importation and display module receives input defining at least one ROI by displaying an image of the scene and receiving a selection of a portion of that image.

37. The system of claim 36, wherein the selection is performed by drawing a closed region to define the ROI.

38. The system of claim 28, wherein two or more ROIs are defined and wherein the plotting module colors the pixel traces for each ROI in a different color.

39. The system of claim 28, wherein the plotting module further identifies, on the parallel axis plot, the range of the constraint on the associated axis.

40. The system of claim 28, wherein the plotting module displays the plot within a graphical user interface screen, the graphic user interface screen having means for interactively defining the constraint.

41. The system of claim 28, wherein the image importation and display module is further operable to transform one or more of the images to a different intensity scale.

42. The system of claim 28, wherein the image importation and display module is further operable to display a pixel image of pixels satisfying the constraint.

43. The system of claim 28, wherein the evaluating step is performed using Mahalanobis ellipses.

44. The system of claim 28, wherein the quantitative analysis module is further operable to display a graphical representation of the results of the evaluating step.

45. The system of claim 28, further comprising the step of displaying a numerical representation of the results of the evaluating step.

46. The system of claim 28, wherein at least one of the sensors is from the group: magnetic field sensor, gravitational field sensor, temperature sensor, or pressure sensor.

* * * * *